(12) United States Patent
Gromley et al.

(10) Patent No.: US 7,320,562 B1
(45) Date of Patent: *Jan. 22, 2008

(54) PNEUMATIC TRANSPORT TUBE SYSTEM

(75) Inventors: Neil Gromley, Kensington, OH (US); Mark Mahaffey, New Philadelphia, OH (US); Brian Wetrich, Canton, OH (US); Robert Klatt, Canal Fulton, OH (US); Dustin Cairns, Deerfield, OH (US); Allan Bakerink, Latrobe, PA (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/521,250

(22) Filed: Sep. 14, 2006

Related U.S. Application Data

(60) Provisional application No. 60/717,999, filed on Sep. 16, 2005, provisional application No. 60/717,980, filed on Sep. 16, 2005, provisional application No. 60/717,963, filed on Sep. 16, 2005, provisional application No. 60/717,950, filed on Sep. 16, 2005, provisional application No. 60/717,932, filed on Sep. 16, 2005, provisional application No. 60/717,931, filed on Sep. 16, 2005, provisional application No. 60/717,930, filed on Sep. 16, 2005, provisional application No. 60/717,929, filed on Sep. 16, 2005, provisional application No. 60/717,895, filed on Sep. 16, 2005, provisional application No. 60/717,859, filed on Sep. 16, 2005, provisional application No. 60/717,854, filed on Sep. 16, 2005, provisional application No. 60/717,847, filed on Sep. 16, 2005.

(51) Int. Cl.
*B65G 51/26* (2006.01)

(52) U.S. Cl. .................. 406/112; 406/110; 406/176
(58) Field of Classification Search ............... 406/110, 406/111, 112, 156, 176, 179, 180, 182, 193, 406/197; 138/100, 96 R; 221/278; 74/89.18
See application file for complete search history.

(56) References Cited

U.S. PATENT DOCUMENTS 1,454,169 A * 5/1923 Hepperle .................... 406/192

(Continued)

FOREIGN PATENT DOCUMENTS

WO PCT/US98/09178 11/1998

OTHER PUBLICATIONS

U.S. Appl. No. 08/889,033, Frazzitta.

*Primary Examiner*—Joe Dillon, Jr.
(74) *Attorney, Agent, or Firm*—Ralph E. Jocke; Daniel D. Wasil; Walker & Jocke

(57) ABSTRACT

A pneumatic transport system including an up receive/down send customer terminal having a pivot assembly for vertically and pivotally displacing a pneumatic carrier between a vertical position and an angularly disposed presentation position. The customer terminal includes a movable carrier cradle assembly to absorb relatively small impact forces from a vehicle mirror or other moving object. The carrier cradle assembly also includes a break away feature for limiting damage to the customer terminal from greater impact forces. A blower in the customer terminal is operative in pressure and vacuum modes to supply pressure differentials to selectively move the carrier. An up receive/down send operator terminal includes a rotatable door for opening and closing a carrier access opening. A component panel assembly is movable to allow access to terminal components of the operator terminal.

21 Claims, 17 Drawing Sheets

U.S. PATENT DOCUMENTS

| | | | | |
|---|---|---|---|---|
| 1,537,569 | A | * | 5/1925 | Whittier et al. ............... 186/14 |
| 1,585,304 | A | * | 5/1926 | MacLaren ...................... 406/9 |
| 1,616,418 | A | * | 2/1927 | Hepperle ....................... 406/3 |
| 1,972,272 | A | * | 9/1934 | Needham ..................... 406/19 |
| 2,034,918 | A | * | 3/1936 | Needham et al. ........... 406/110 |
| 2,647,706 | A | * | 8/1953 | Sindzinski .................. 406/180 |
| 3,080,136 | A | * | 3/1963 | Keiley et al. ............... 406/111 |
| 3,237,882 | A | * | 3/1966 | Grosswiller, Jr. et al. ... 406/110 |
| 3,282,531 | A | * | 11/1966 | Stewart ....................... 406/28 |
| 3,367,603 | A | * | 2/1968 | Feyerherd ................... 406/182 |
| 3,610,554 | A | * | 10/1971 | Schwarz et al. ............ 406/112 |
| 3,659,809 | A | * | 5/1972 | Cook ........................... 406/112 |
| 3,689,009 | A | * | 9/1972 | Terrell ........................ 406/110 |
| 3,706,428 | A | * | 12/1972 | Carlier ........................ 406/110 |
| 3,724,690 | A | * | 4/1973 | Bates ........................... 406/52 |
| 3,755,977 | A | * | 9/1973 | Lewis ........................... 52/98 |
| 3,756,536 | A | * | 9/1973 | Weissmuller et al. ....... 406/112 |
| 3,762,664 | A | * | 10/1973 | Loveless ...................... 406/182 |
| 3,790,102 | A | * | 2/1974 | Tearne et al. ............... 406/112 |
| 3,948,466 | A | * | 4/1976 | Rudder et al. ................ 406/73 |
| 3,976,264 | A | * | 8/1976 | Ekama et al. ............... 406/112 |
| 3,985,316 | A | * | 10/1976 | Weissmuller ................ 406/110 |
| 3,998,405 | A | * | 12/1976 | Carlier ........................ 406/112 |
| 4,004,753 | A | * | 1/1977 | Thomas et al. ............. 406/110 |
| 4,032,082 | A | * | 6/1977 | Weissmuller ................ 406/112 |
| 4,047,677 | A | * | 9/1977 | Hochradel et al. .......... 406/110 |
| 4,059,246 | A | * | 11/1977 | Anders et al. ................ 406/31 |
| 4,135,684 | A | * | 1/1979 | Willey ........................ 406/13 |
| 4,157,796 | A | * | 6/1979 | Warmann .................... 406/31 |
| 4,256,418 | A | * | 3/1981 | Stangl ........................ 406/112 |
| 4,343,574 | A | * | 8/1982 | Anders ........................ 406/13 |
| 4,352,603 | A | * | 10/1982 | Anders ........................ 406/27 |
| 4,355,930 | A | * | 10/1982 | Carlier ....................... 406/182 |
| 4,437,797 | A | * | 3/1984 | Kardinal ..................... 406/110 |
| 4,459,069 | A | * | 7/1984 | Ahr et al. ..................... 406/74 |
| 4,462,721 | A | * | 7/1984 | Anders et al. .............. 406/112 |
| 4,512,688 | A | * | 4/1985 | Hochradel .................. 406/111 |
| 4,661,026 | A | * | 4/1987 | Carlier ........................ 406/74 |
| 4,715,750 | A | * | 12/1987 | Podoll et al. ............... 406/111 |
| 4,930,941 | A | * | 6/1990 | Willey et al. ................. 406/10 |
| 4,941,777 | A | * | 7/1990 | Kieronski .................... 406/13 |
| 5,131,792 | A | * | 7/1992 | Grosswiller et al. ........ 406/112 |
| 5,209,609 | A | * | 5/1993 | Lang ........................ 406/112 |
| 5,211,513 | A | * | 5/1993 | Scott ........................ 406/112 |
| 5,215,412 | A | * | 6/1993 | Rogoff et al. ............. 406/112 |
| 5,299,891 | A | * | 4/1994 | Grosswiller et al. ........ 406/112 |
| 5,304,017 | A | * | 4/1994 | Vogel et al. ................ 406/111 |
| 5,356,243 | A | | 10/1994 | Vogel |
| 5,368,417 | A | * | 11/1994 | Benjamin et al. ........... 406/111 |
| 5,473,114 | A | * | 12/1995 | Vogel ......................... 174/47 |
| 5,562,367 | A | * | 10/1996 | Scott ........................... 406/13 |
| 5,735,644 | A | * | 4/1998 | Grosswiller et al. ........ 406/112 |
| 6,146,057 | A | | 11/2000 | Gromley |
| 6,672,807 | B1 | | 1/2004 | McIntyre |
| 7,140,810 | B1 | * | 11/2006 | Christian et al. ........... 406/112 |
| 7,220,082 | B1 | * | 5/2007 | Christian et al. ........... 406/112 |

* cited by examiner

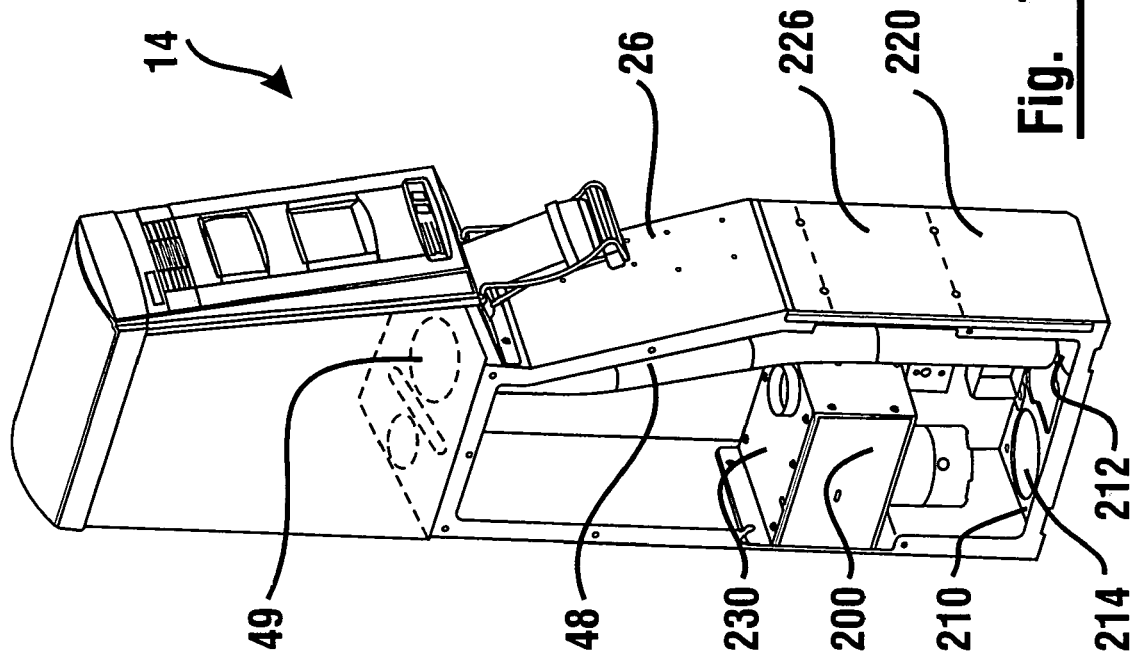
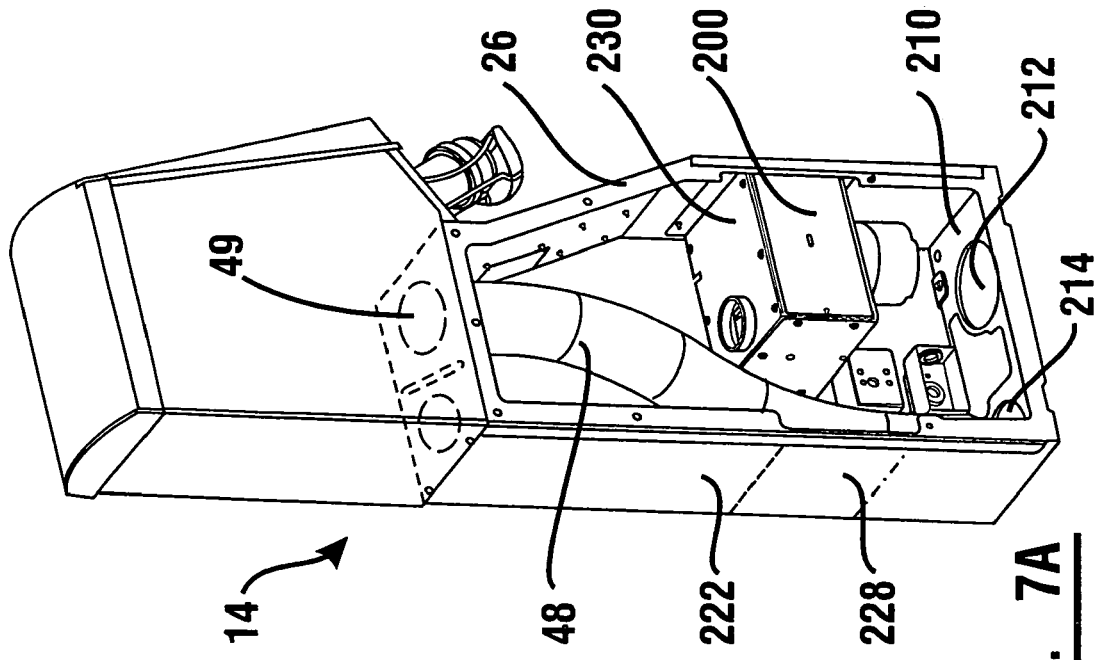

PNEUMATIC TRANSPORT TUBE SYSTEM

CROSS REFERENCE TO RELATED APPLICATIONS

This application claims benefit pursuant to 35 U.S.C. § 119(e) of each of the following provisional applications, each of which was filed on Sep. 16, 2005 and the disclosure of each of which is incorporated herein by reference: 60/717,932; 60/717,847; 60/717,854; 60/717,950; 60/717,999; 60/717,980; 60/717,895; 60/717,930; 60/717,931; 60/717,929; 60/717,963; and 60/717,859.

TECHNICAL FIELD

The present invention relates generally to the area of pneumatic transport systems, and exemplary embodiments have particular applicability to down send pneumatic transport tube systems.

BACKGROUND ART

Pneumatic transport tube systems typically transport a carrier through a transport tube between at least two terminals. The carrier is moved by creating pneumatic pressure differentials within the transport tube with respect to the ends of the carrier. Pneumatic transport tube systems are often utilized by banks. A teller terminal, located in the bank, is connected by a pneumatic transport tube to a customer terminal located outside the bank such that a customer may use the customer terminal which is accessible from a vehicle. Typically, the carrier in such systems is cylindrical and removable through the transport tube between the customer and teller terminals. The transport tube connecting the teller and customer terminals may in some systems be installed overhead and in other systems be installed underground. Consequently, a terminal for use with an underground transport tube system may also be referred to as an up-receive/downsend terminal or simply a downsend terminal.

The force available to move the carrier through the transport tube between the customer and the teller terminals is determined by the pneumatic pressure differentials developed across the carrier. The maximum pressure differential is a design parameter and is determined by the size of the blowers, motors and other devices used to create differential pressure. Consequently, pneumatic transport tube systems have a maximum pressure differential that may be applied across the carrier, and that maximum pressure differential is a factor that impacts the maximum load carrying capability of the carrier.

In some prior down send terminals, the carrier is received in the terminal and then moved to an exchange station in which the carrier is out of the transport tube and within reach of the user. After finishing a transaction, the user typically inserts the carrier directly into a vertical section of the transport tube. The user may inadvertently fill the carrier with a load that exceeds the maximum load carrying capacity of the carrier. Consequently, if a carrier is overloaded, the carrier may drop to the bottom of the vertical tube section of the terminal and stop. The pneumatic forces developed in the transport tube may be insufficient to move the carrier through the transport tube. Therefore, the transport tube system is out of service until the overloaded carrier is manually removed. Down send terminals, to which the user has direct access to the transport tube, may have other disadvantages. For example, debris or other materials may be intentionally or inadvertently put into the vertical tube section.

U.S. Pat. No. 5,356,243 addresses the problems discussed above by providing a vertical transport tube section which pivots about a stationary upper horizontal axis to move the carrier between the vertical send/receive position and an oblique but generally vertical presentation position. The transport tube construction generally prevents an overloaded carrier from entering the transport tube system. Further, the construction reduces the risk of debris or foreign matter inadvertently entering the system.

While the general concept disclosed in U.S. Pat. No. 5,356,243 addresses some of the problems associated with a down send system, there is a need for improved transport tube systems. For example, there exists a need in the art for improved sealing means and methods in a pneumatic transport system.

There also exists a need for improved performance of pneumatic transport systems. For example, there exist needs for improvements in blower life and performance, improved accessibility to system components for service or replacement, retrofit options for existing pneumatic systems, and more user-friendly terminals.

Additionally, if a vehicle strikes a terminal carrier support such as with a vehicle mirror, major structural damage can occur to the terminal and/or to the vehicle. Thus there exists a need for a carrier cradle assembly that flexes and/or breaks away before significant structural damage occurs to the carrier cradle assembly or the supporting structures.

Exemplary embodiments address the above concerns while providing a pneumatic transport tube system having improved features and performance.

DISCLOSURE OF INVENTION

To overcome limitations associated with prior pneumatic transport tube systems, an exemplary embodiment provides a pneumatic transport system having a pneumatic transport tube with a customer terminal end operatively connected to an up receive/down send customer terminal and an up receive/down send operator terminal end operatively connected to an operator terminal, wherein a carrier is movable between and within the terminals.

An exemplary customer terminal includes a first frame member, a pivot assembly, a carrier cradle assembly, and an air supply assembly. The pivot assembly provides for selective movement of the carrier between the transport tube and a presentation position.

An exemplary operator terminal includes a second frame member, a door assembly, a catch assembly, and a panel assembly. In an exemplary operator terminal, each assembly is accessible for replacement and/or servicing from the front of the operator terminal.

In an exemplary customer terminal, the pivot assembly comprises at least one mounting plate, a tubular member for receiving the carrier through an open first end, a pivot pin mounted on the tubular member that is adapted for movement within a vertical slot in the mounting plate, and a displacement mechanism operable to pivotally and vertically displace the tubular member between a first substantially vertical position and a second oblique position. A sealing member circumferentially disposed about the open first end of the tubular member cooperates with a sealing member on an interface edge of the transport tube to seal the interface therebetween. The displacement mechanism includes a motor controlled by a control circuit having current indicating output suitable to detect a stall condition in the motor.

The exemplary pivot assembly includes a tubular sleeve for directing movement of the carrier from within the tubular member to the carrier cradle assembly. When the tubular member is in the oblique second position, the tubular member and the tubular sleeve cooperate to provide a substantially continuous conduit for passage of the carrier. A sealing member at the interface edge of the tubular sleeve cooperates with the sealing member at the first end of the tubular member to seal the interface therebetween.

In the pivot assembly, an exemplary displacement mechanism includes a drive mechanism to direct movement of a cam follower, in supporting connection with the tubular member, to traverse a cam groove formed in a cam member. The drive mechanism includes a driver, rotatable in response to a drive motor, and a driven member having a drive slot therein. The cam follower is operably received within the drive slot. Movement of the driven member causes movement of the cam follower within the cam groove. The cam follower is operable responsive to the drive mechanism to traverse the cam groove in a first manner whereby the tubular member is displaced from the vertical position to the oblique position. A reversal of the drive mechanism causes the cam follower to traverse the cam groove in a second manner whereby the tubular member is displaced from the oblique position to the vertical position, aligned with the vertical transport tube run. The pivot pin moves in a vertical slot in the mounting plate, responsive to movement of the cam follower.

In an exemplary customer terminal, the carrier cradle assembly is operative to selectively support the carrier in a presentation position substantially outside of the tubular member. The cradle assembly comprises a mounting bracket, a cradle body mounted in supporting connection with the mounting bracket, and a mounting mechanism operable to mount the mounting bracket to the pivot assembly. The mounting mechanism may comprise at least one flex mechanism including a spring member. If the cradle body encounters a relatively small generally horizontally directed force, the cradle body deflects away from an initial position. When the force is removed, the cradle body returns to its initial position.

In an exemplary embodiment, the mounting bracket of the cradle assembly may additionally or alternately include at least one frangible member, disposed adjacent the cradle body. The frangible member is operable to break when a force exerted against the cradle body exceeds a threshold value. In this exemplary embodiment, the cradle body is operative to "break away" to prevent substantial structural damage to the customer terminal and/or a vehicle that impacts the cradle body. Repairing the customer terminal of the exemplary embodiment merely requires mounting another carrier cradle assembly to the pivot assembly.

In an exemplary customer terminal, the air supply assembly is operative to supply first and second pressure differentials across the carrier. An exemplary air supply assembly includes a blower assembly including a blower housing which houses a blower motor. In some exemplary embodiments, the blower assembly includes a pivotal valve disposed within the blower chamber to regulate operation of the assembly between pressure and vacuum modes. In other exemplary embodiments, a diverter valve assembly is in flow communication with the blower assembly in order to alternately apply the blower assembly output between a vacuum mode and a pressure mode. The blower motor of some embodiments may be a switched reluctance blower motor in order to provide advantages over traditional brush motor blowers, especially as related to blower life, i.e. approximately 6000 hours versus 500 hours.

An exemplary embodiment of the customer terminal is adapted for use in new construction or retrofit applications. The customer terminal includes a frame member having a forward wall portion, a rearward wall portion, and a bottom wall portion, wherein the bottom wall portion includes forward and rearward open regions. The air supply assembly may include a blower housing selectively mounted to the forward wall portion or the rearward wall portion. If the customer end of the pneumatic transport tube is adapted to be received through the rearward open region, then the blower housing may be mounted to the forward wall portion. Alternately, if the customer end is adapted to be received through the forward open region, then the blower chamber may be mounted to the rearward wall portion.

The exemplary customer terminal may include a pivot assembly supported on the frame member. The pivot assembly is adapted to be in operational connection with a customer end of the pneumatic transport tube at an interface site. In the exemplary embodiment, the interface site remains the same regardless of whether the pneumatic transport tube extends through the forward open region or the rearward open region. A tube segment may extend from the customer end to the interface site. The tube segment is dimensioned for passage of a carrier therethrough.

In an exemplary embodiment, the operator terminal comprises a different construction than the customer terminal. In an exemplary operator terminal, a carrier within the terminal is accessed through a carrier access opening. A door assembly, supported on a frame member, is operative to selectively open and close the carrier access opening. The door assembly includes a door member rotatable about a vertical axis in response to operation of a door drive mechanism. The door drive mechanism includes a sprocket and a drive tape which is engaged with the door member. The sprocket moves responsive to a motor controlled by a control circuit having current draw sensing capability that is operative to detect a stall condition in the motor.

In an exemplary operator terminal, a catch assembly is operative to selectively prevent the carrier from downward movement within the operator terminal. The catch assembly may include a catch mechanism comprising a movable catch member operable to selectively engage the bottom end of the carrier such that an upper end of the carrier is biased toward the access opening.

In an exemplary operator terminal, a panel assembly is selectively mounted to the operator terminal frame member. The panel assembly includes a component panel selectively positionable between an operative position and a service position. At least one operator terminal component is carried on a mounting surface of the component panel, wherein when the component panel is in the operative position, the mounting surface faces the rear of the terminal. When the component panel is in the service position, the at least one operator terminal component is accessible from the front of the operator terminal. The construction of the operator terminal may also allow for the door assembly and the catch assembly to be readily accessed from the front of the terminal for servicing or replacement.

Accordingly, it is an object of exemplary embodiments to provide a pneumatic transport system having a pneumatic transport tube through which a carrier is moved utilizing a single blower assembly mounted in the customer terminal.

It is a further object of exemplary embodiments to provide a customer terminal having a pivot assembly for moving a carrier between the transport tube and a carrier cradle assembly.

It is a further object of exemplary embodiments to prevent substantial structural damage to the customer terminal if the cradle body is impacted with a generally horizontally-directed force.

It is a further object of exemplary embodiments to provide a customer terminal adapted for retrofit applications.

It is a further object of exemplary embodiments to provide a customer terminal utilizing a switched reluctance blower motor to provide first and second pressure differentials for moving the carrier through the system.

It is a further object of exemplary embodiments to provide an operator terminal having a door assembly, a catch assembly, and a panel assembly, wherein each assembly is accessible for replacement or service from a position in front of the operator terminal.

It is a further object of exemplary embodiments to provide an operator terminal which utilizes a drive mechanism including a sprocket and drive tape to rotate a door member between an open and a closed position.

It is a further object of exemplary embodiments to provide a motor control integrated circuit which provides a current sense output to monitor operation of the motors which drive various system components.

It is a further object of exemplary embodiments to provide a method of moving a carrier through a pneumatic transport tube system.

It is a further object of exemplary embodiments to provide methods of operating a customer terminal and an operator terminal.

It is a further object of exemplary embodiments to provide methods of servicing a pneumatic transport system.

These and other objects of exemplary embodiments will become more readily apparent from the following description of exemplary embodiments taken together with the accompanying drawings and the appended claims.

BRIEF DESCRIPTION OF DRAWINGS

FIGS. 7A-7B are isometric views of an exemplary customer terminal showing alternate mounting sites for a blower housing.

BEST MODES FOR CARRYING OUT INVENTION

Figure 1:
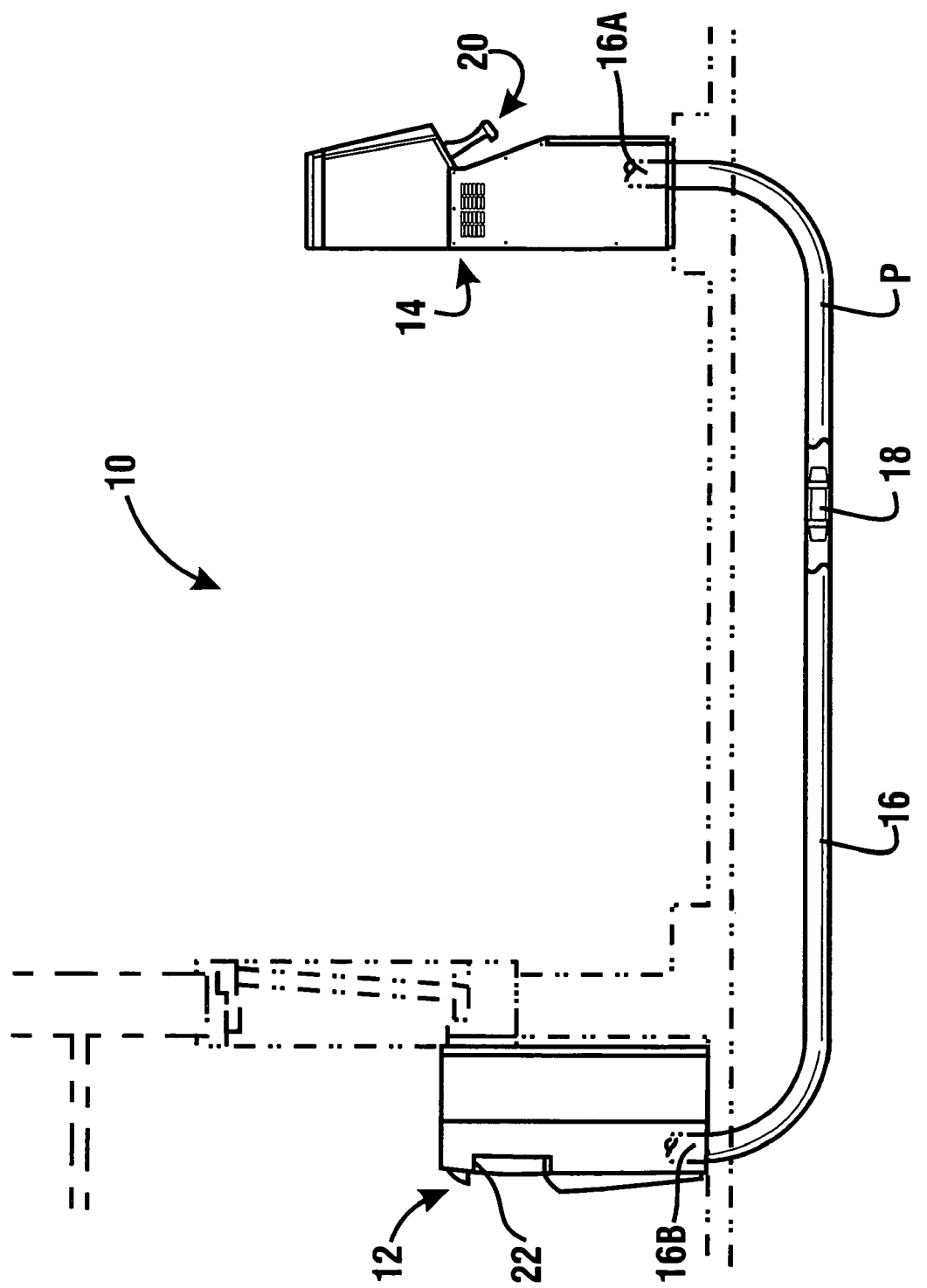
FIG. 1 is a side elevational view of an exemplary pneumatic transport system for use in a banking operation.

Referring now to the drawings which are presented for the purpose of illustrating exemplary embodiments only, and not for the purpose of limiting the same, FIG. 1 shows a point-to-point pneumatic transfer system 10 for use, for example, in a banking operation. System 10 is basically comprised of an operator terminal 12 and a customer terminal 14 which are connected by an underground pneumatic transport tube 16. Transport tube 16 is cylindrical in shape and is dimensioned to receive a cylindrical carrier 18. Carrier 18 is adapted to carrying articles through transport tube 16 between operator terminal 12 and customer terminal 14, and to be removable from such terminals 12, 14, i.e., carrier 18 is a "noncaptive" carrier.

The construction of carrier 18 of the exemplary embodiment is suitable for movement responsive to differential pressure between the customer and operator terminals. Broadly stated, carrier 18 is comprised of a tubular body portion having frustoconical end portions. Adjacent each end portion is an annular resilient surface dimensioned to have an outer diameter which closely approximates the inner diameter of the transport tube 16. These annular surfaces generally seal the carrier against the inner surface of the transport tube 16. The tubular body portion of carrier 18 defines an internal cavity for containing the articles to be transferred. Access to the internal cavity may in some embodiments be by moving an end cap, or in other embodiments by a side door through the tubular portion of the carrier. Of course in other embodiments other types of carriers, including "captive" type carriers which do not leave the transport tube, may be used.

Operator terminal 12 is adapted to be positioned within a building such as in a bank at a teller station. The teller station may include a window which provides a view for the teller to the customer terminal 14. Alternately, or in addition, video equipment may provide a view of the customer terminal 14 and persons using it.

Customer terminal 14 is adapted to be positioned remotely from the operator terminal such as outside a building such that a customer may access the customer terminal 14 from within a vehicle. This described use of the pneumatic transport system is merely exemplary and other embodiments may be used in other types of transaction environments.

In exemplary embodiments, transport tube 16 may be formed of commercially available tubing having a circular nominal 4⅛" inner diameter, although other sizes and shapes of tubing may be used. In exemplary embodiments, the transport tube 16 is adapted to be primarily disposed extending horizontally beneath the ground surface and having a generally vertically extending customer end 16A and an operator end 16B which are adapted to be received within the terminals.

Operator terminal 12 and customer terminal 14 are herein referred to as "up receive/down send" terminals indicative of the movement of the carrier 18 therein. The carrier 18 is moved through the system by creating pneumatic pressure differentials within the transport tube 16.

Customer terminal 14 may include user interface components such as a display, call/send buttons, and audio and video equipment, which are not shown in this view. A carrier cradle assembly 20 is provided for presentation of the carrier 18 to the customer.

Operator terminal 12 may also include operator buttons to control movement of the carrier 18 through the pneumatic transport system (not shown in this view). Access to the carrier 18 at the operator terminal is provided through a carrier access opening 22, as will be discussed in greater detail below.

Figure 2:
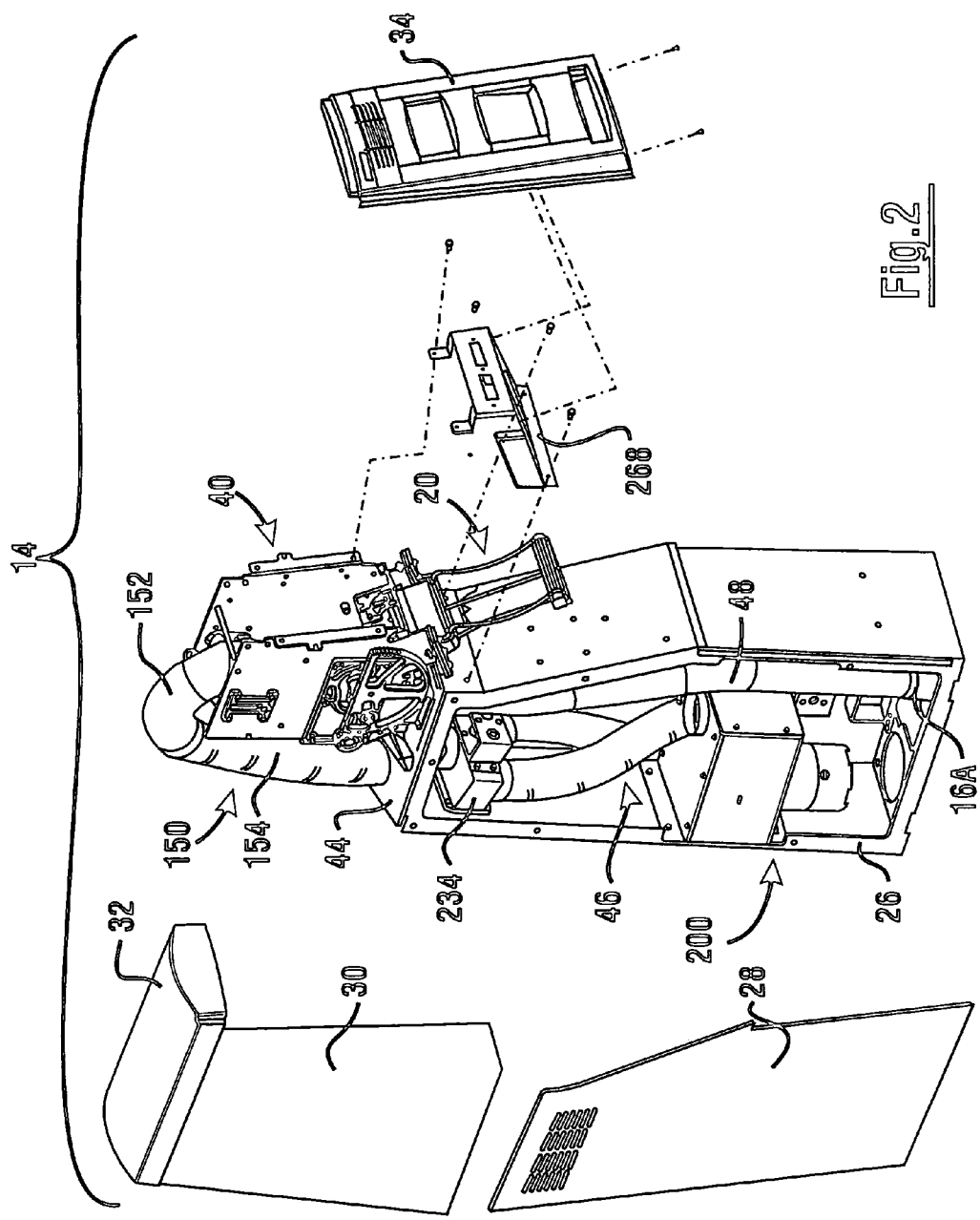
FIG. 2 is an isometric view, partial broken away of an exemplary customer terminal.
Figure 3:
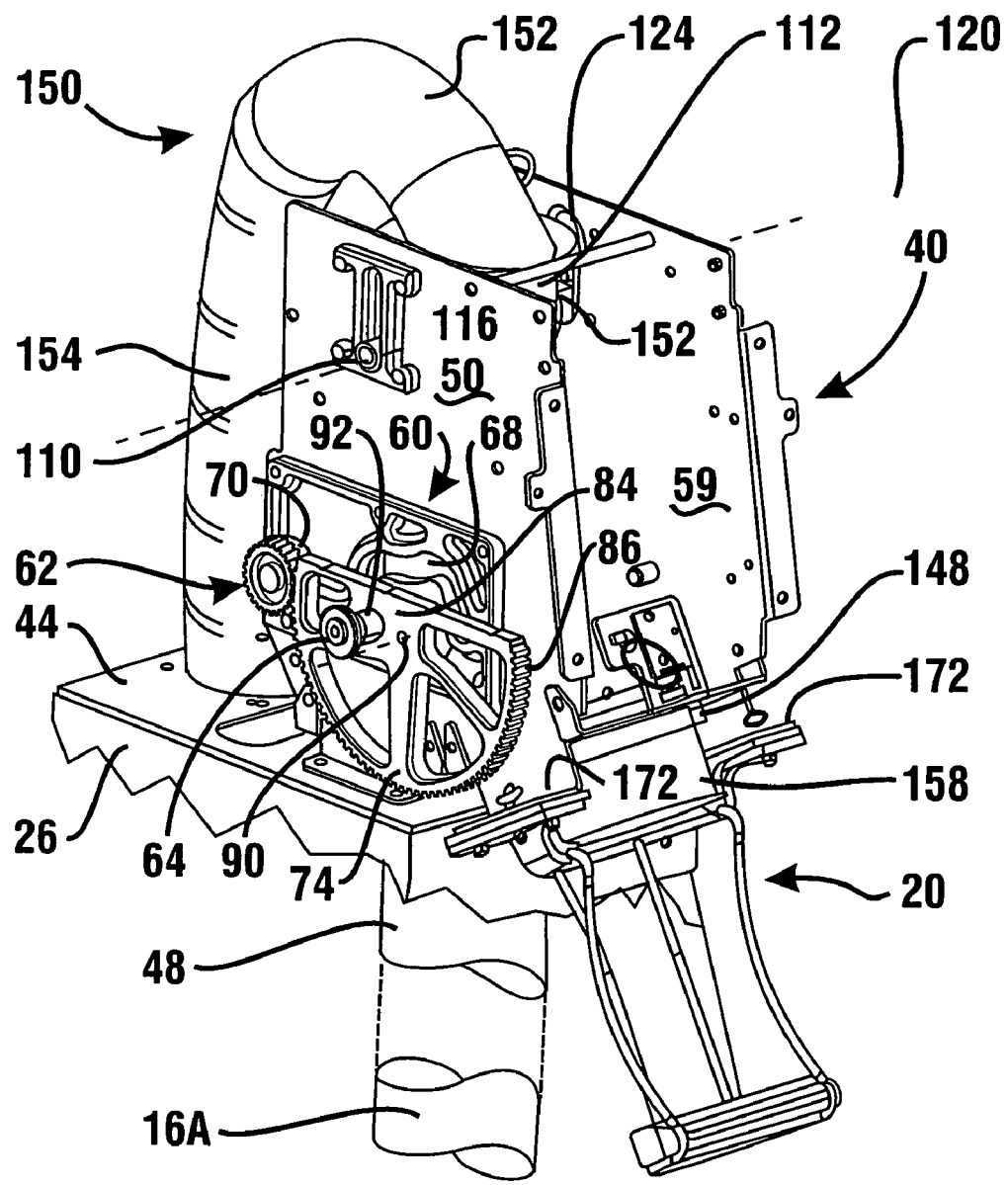
FIG. 3 is a partial isometric view of an exemplary customer terminal.
Figure 4:
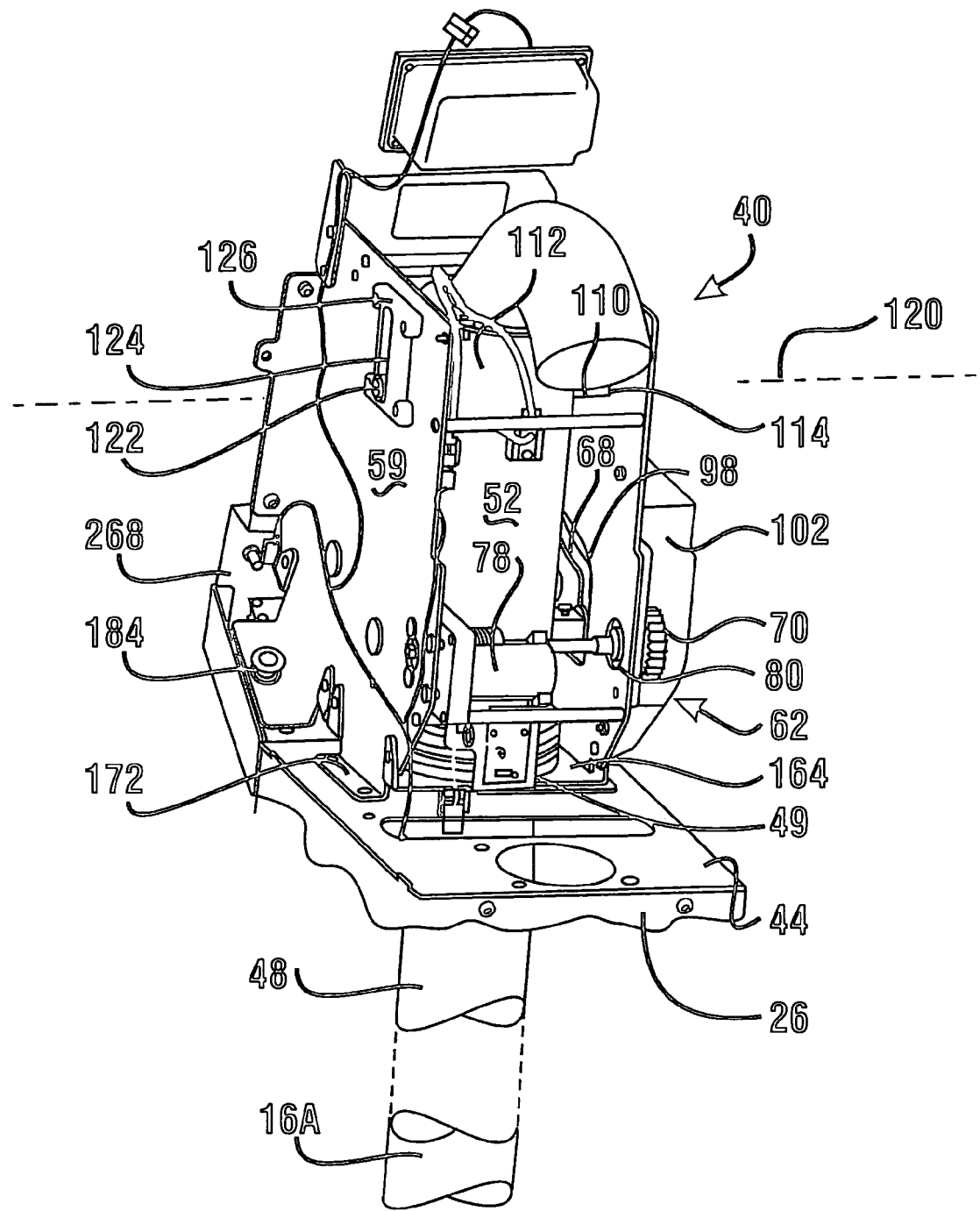
FIG. 4 is a partial isometric view of an exemplary customer terminal.

With reference to FIGS. 2-4, customer terminal 14 includes a frame 26 for supporting several customer terminal components. Exemplary embodiments of customer terminal 14 may also include a side access cover 28, a top side fascia 30, a top cover 32, and a front fascia 34, all of which cooperate and are in supported connection with frame 26 to form a housing for certain customer terminal components.

Generally, exemplary customer terminal 14 includes a pivot assembly 40 supported on an upper support surface 44 of frame 26. Customer terminal further includes an air supply assembly 46 which is alternatively referred to as a blower herein, for applying pressure differentials to the system for movement of pneumatic transport of carrier 18. In an exemplary embodiment, a carrier cradle assembly 20 is mounted in supporting connection to the pivot assembly 40. A tube segment 48 may extend from customer end 16A of the pneumatic transport tube 16 and provide an operative connection with the pivot assembly 40 for transport of the carrier 18 as will be discussed in further detail below. In other exemplary embodiments, pivot assembly 40 may directly connect with customer end 16A. The connection site of pivot assembly 40 with the customer end 16A, either directly or indirectly, occurs at an "interface site." In an exemplary embodiment, the interface site 49 is located at the junction of pivot assembly 40 and tube segment 48, best seen in FIG. 4.

Support surface 44 includes one or more openings therethrough for the passage of wires, cables, and the like between components situated above and below the support surface 44. Other openings in support surface 44 are provided to accommodate the operation of the air supply assembly 46 and to provide for the interface of the pivot assembly 40 with the transport tube.

The construction and operation of the exemplary pivot assembly is described with particular reference to FIGS. 3, 4 and 5A-D. The pivot assembly, generally denoted 40, includes a first mounting plate 50 which is mounted in supporting connection to frame member 26 in an upper region of the customer terminal 14. The pivot assembly 40 includes a tubular member 52 that selectively undergoes pivotal and vertical displacement between a first substantially vertical position, shown in FIGS. 3, 4 and FIG. 5A and a second oblique position, shown in FIG. 5D.

When tubular member 52 is in the first vertical position, its longitudinal axis 53 is generally vertically disposed and a first end 58 of the tubular member is in operable connection with the customer end 16A of the pneumatic transport tube through an interface site 49 as described above (best seen in FIG. 5A). When tubular member 52 is in the oblique presentation position, the longitudinal axis 53 is disposed at an acute angle relative to the vertical direction as illustrated in FIG. 5D. In the exemplary embodiment, the included angle, α, between the vertical first position and the oblique second position ranges from about 25° to about 35°. The exact value of α will largely be determined by the particular embodiment. The exemplary tubular member 52 is dimensioned in length and diameter so as to be operative to receive a pneumatic carrier 18 therein, shown in phantom in FIG. 5A. In the exemplary embodiment, tubular member 52 comprises a diameter substantially equal to the diameter of the pneumatic transport tube 16. The tubular member is dimensioned so that annular rings or sealing members disposed at the ends of the carrier are engaged in generally movable fluid tight relation with the interior wall of the tubular member.

In the exemplary embodiment, the pivot assembly includes a second mounting plate 59, horizontally spaced from first mounting plate 50, with the tubular member 52 supported therebetween, as shown in FIGS. 3 and 4. Of course this approach is exemplary and in other embodiments other supporting means and approaches may be used. As best seen in FIGS. 3 and 4, in the exemplary embodiment, each mounting plate comprises an essentially flat body member with internally and externally directed surfaces. Certain mounting flanges extend outwardly from the mounting plates as will be explained in further detail below.

In the exemplary embodiment, a displacement mechanism, generally denoted 60, is in supporting connection with the first mounting plate 50. The displacement mechanism is operable to cause concerted vertical and pivotal movement of the tubular member 52 between the vertical and oblique positions.

With particular reference to FIGS. 3 and 5A-5D, the exemplary pivot assembly 40 includes an exemplary displacement mechanism 60 operable to pivotally and vertically displace tubular member 52 in concerted motion. The exemplary displacement mechanism 60 includes a drive mechanism 62 to direct movement of a cam follower 64, operatively connected to the tubular member 52, to traverse a cam groove 68. The cam follower 64 is operable to traverse the cam groove 68 responsive to the drive mechanism 62.

With reference to FIG. 4, the exemplary drive mechanism 62 includes a rotatable driver 70 and a driven member 74. In the exemplary embodiment, the driver 70 comprises a sprocket rotatable on axle 76 responsive to operation of a motor 78. In the exemplary embodiment, axle 76 extends through an opening 80 in first mounting plate 50.

With reference again to FIGS. 3 and 5A-5D, the exemplary driven member 74 includes a semi-circular body 84 having an arched semi-circular outer edge 86 including a plurality of gear teeth 88. The driven member 74 is rotatable about a first axis 90 responsive to engagement of successive teeth with driver 70.

The driven member 74 includes a drive slot 92 therein defined by boundary wall 94. At least a portion of cam follower 64 extends in drive slot 92 and in operative engagement with boundary wall 94. As drive member 74 rotates, engagement of the cam follower 64 with boundary wall 94 moves the cam follower in the cam groove 68. In this exemplary embodiment, drive slot 92 is an open slot, although other constructions may be used in other embodiments. As will be explained in greater detail below, and as illustrated in FIGS. 5A-5D, the driven member is operable to rotate substantially 180° about the axis 90. In other embodiments the body of the driven member may encompass a circular arc greater or less than a semi-circle or may have a non-arcuate structure. As shown in FIG. 3, the body 84 of driven member 74 of some embodiments may include void areas to reduce weight and manufacturing costs.

In this exemplary embodiment, for ease of manufacture and assembly, the cam groove 68 is formed in a cam member 96 that is mounted in supporting connection with the first mounting plate 50. Mounting plate 50 includes an opening 98, best seen in FIG. 4, that is operably co-extensive with the cam groove 68. In other words, in this exemplary embodiment the opening 98 may be larger than the cam groove, but it must at least be as extensive as cam groove 68. If after extensive repetitive operation, the cam member becomes worn in the area of the cam groove, the cam member can be readily replaced without disassembling the mounting plate 50. In other exemplary embodiments, the cam member 96 and the mounting plate 50 may be parts of a unitary component. Of course in other embodiments other approaches may be used.

In the exemplary embodiment, the cam follower 64 extends through the opening 98 in the mounting plate 50 and through cam groove 68. As explained above, at least a portion of cam follower 64 extends into drive slot 92. In an exemplary embodiment, a cam follower includes a cap member 100 to retain the cam follower 64 within drive slot 92.

In an exemplary embodiment, the driven member 74 is mounted in rotational supporting connection with the cam member 96. FIG. 4 shows, a hand guard 102 is utilized to shield the driver 70, the driven member 74, and the cam follower 64.

In the exemplary embodiment, a first pivot pin 110 is mounted in supporting connection near a second end 112 of the tubular member 52, and extends outwardly therefrom. The pivot pin is operable to move within a generally vertical opening 114 formed in the first mounting plate 50. The vertical movement of pivot pin 110 is coordinated with movement of the cam follower 64 in cam groove 68. In an exemplary embodiment, a guide member 116 is mounted in supporting connection with the first mounting plate 50. Guide member includes a vertical slot 118. The vertical slot 56 is operably co-extensive with vertical slot 118. Guide member 116 of the exemplary embodiment provides for precise guided vertical movement of pivot pin 110. Displacement of pivot pin 110 is limited to essentially upward and downward vertical movement, as it rotates about its axis 120. The tubular member 52 is operable to pivot about the axis 120 of pivot pin 110 as directed by movement of cam follower 64.

With reference to FIG. 4, in an exemplary embodiment, a second pivot pin 122 is mounted in supporting connection with the tubular member 52 and extends outwardly therefrom. The second pivot pin 122 is disposed in alignment with and diametrically opposite the first pivot pin 110 so that first and second pivot pins share a common pivot axis 120. Second pivot pin 122 extends through a vertical opening 124 in the second mounting plate 59 (see FIG. 3). In the exemplary embodiment, a second guide member 126 is mounted in supporting connection with the second mounting plate. The vertical opening 124 is operably co-extensive with a vertical slot 128 in the second guide member 126. In other exemplary embodiments, the first and second pivot pins 110, 122 may comprise a unitary body. Of course in other embodiments other approaches may be used.

Figure 5A:
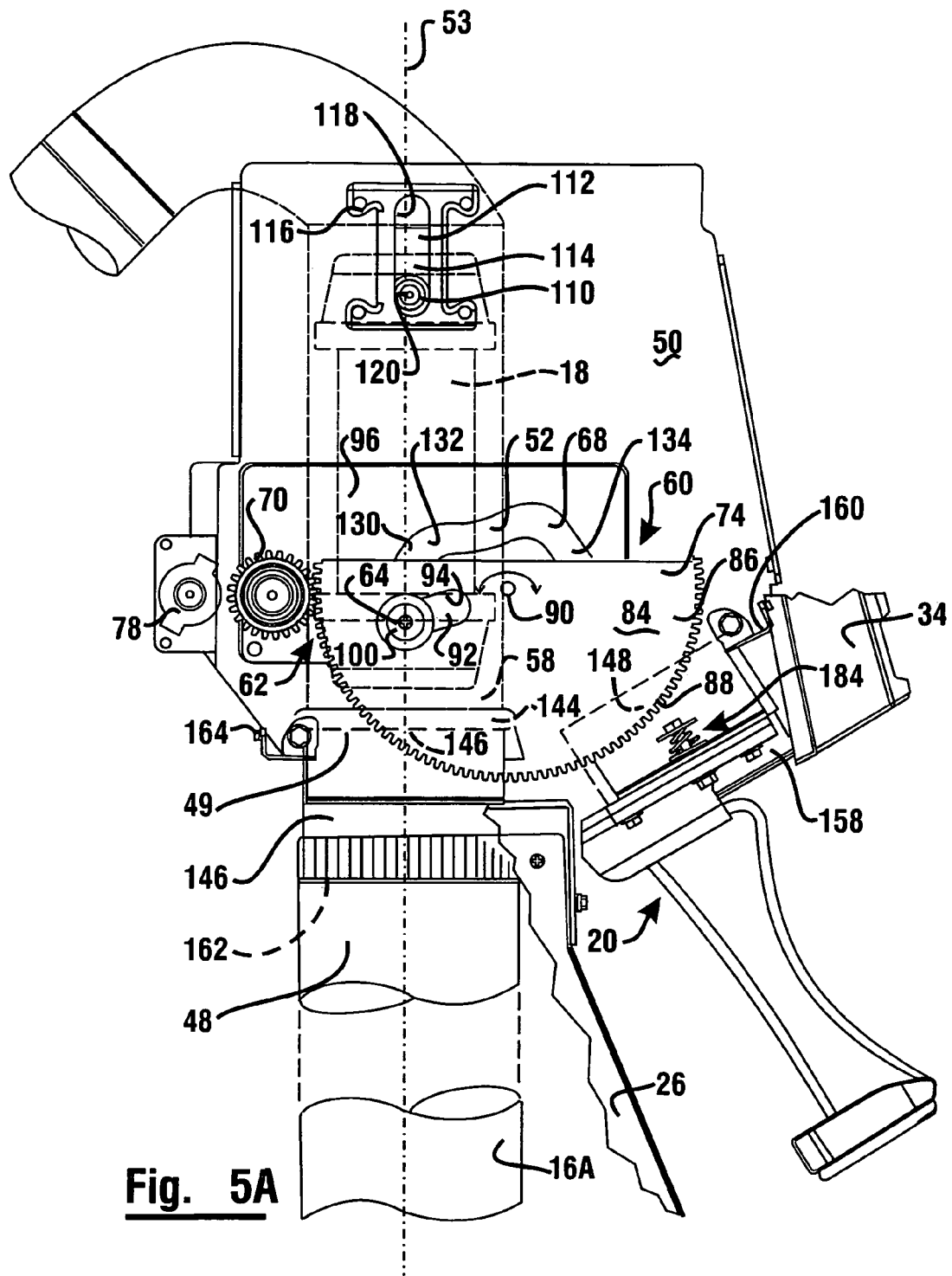
FIGS. 5A-5D are schematic representations of an exemplary pivot assembly illustrating the operation of a displacement mechanism.
Figure 5B:
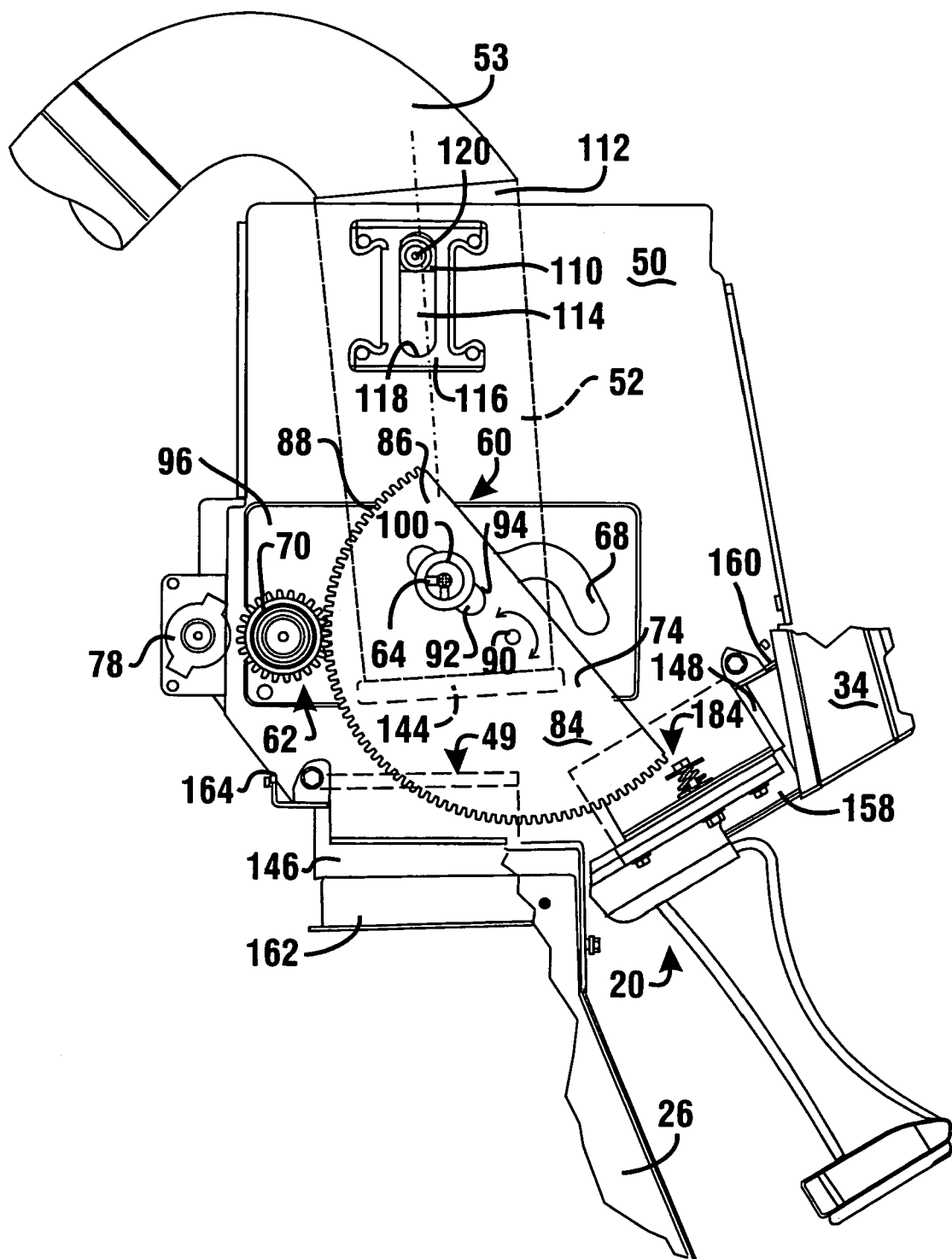
Figure 5C:
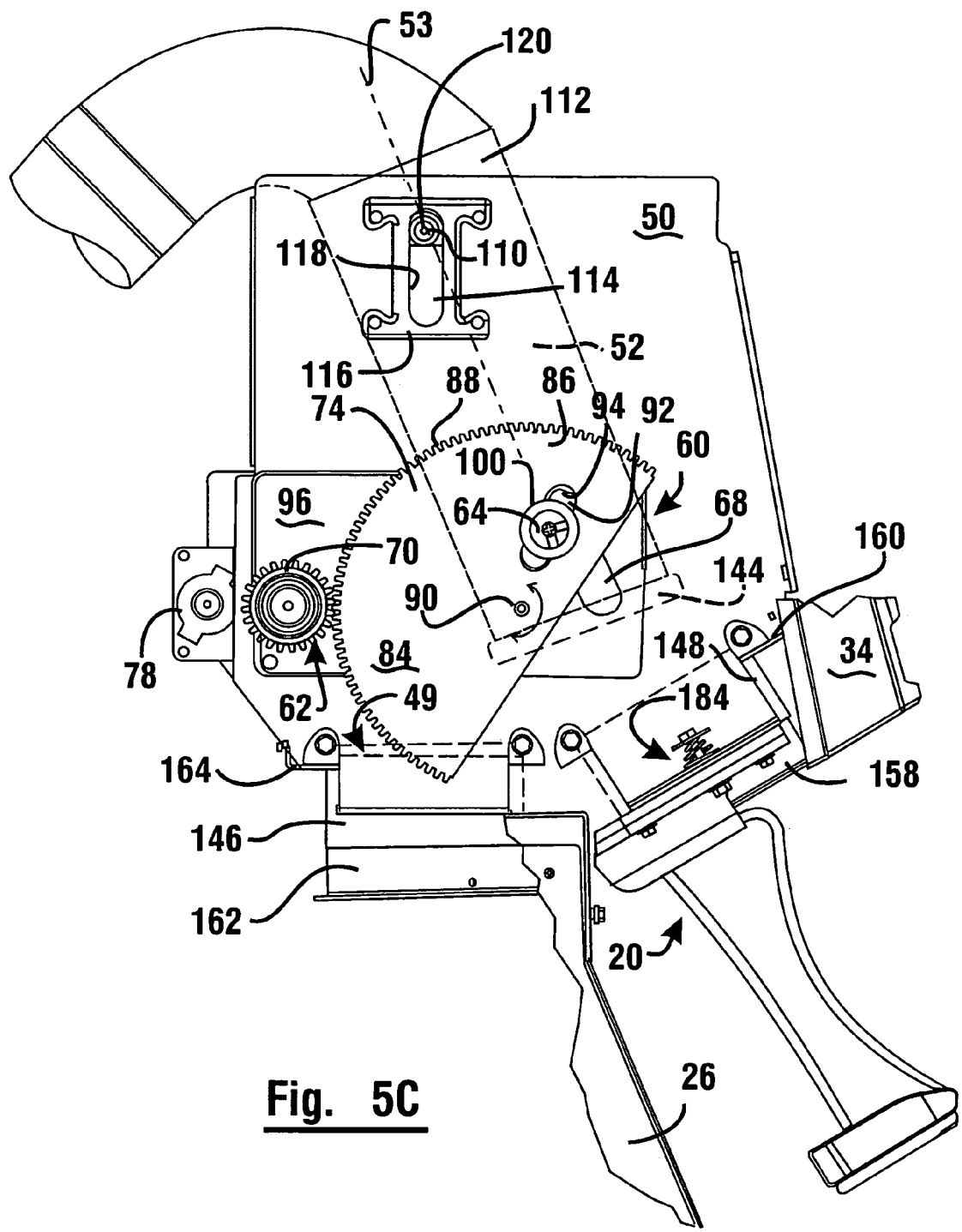
Figure 5D:
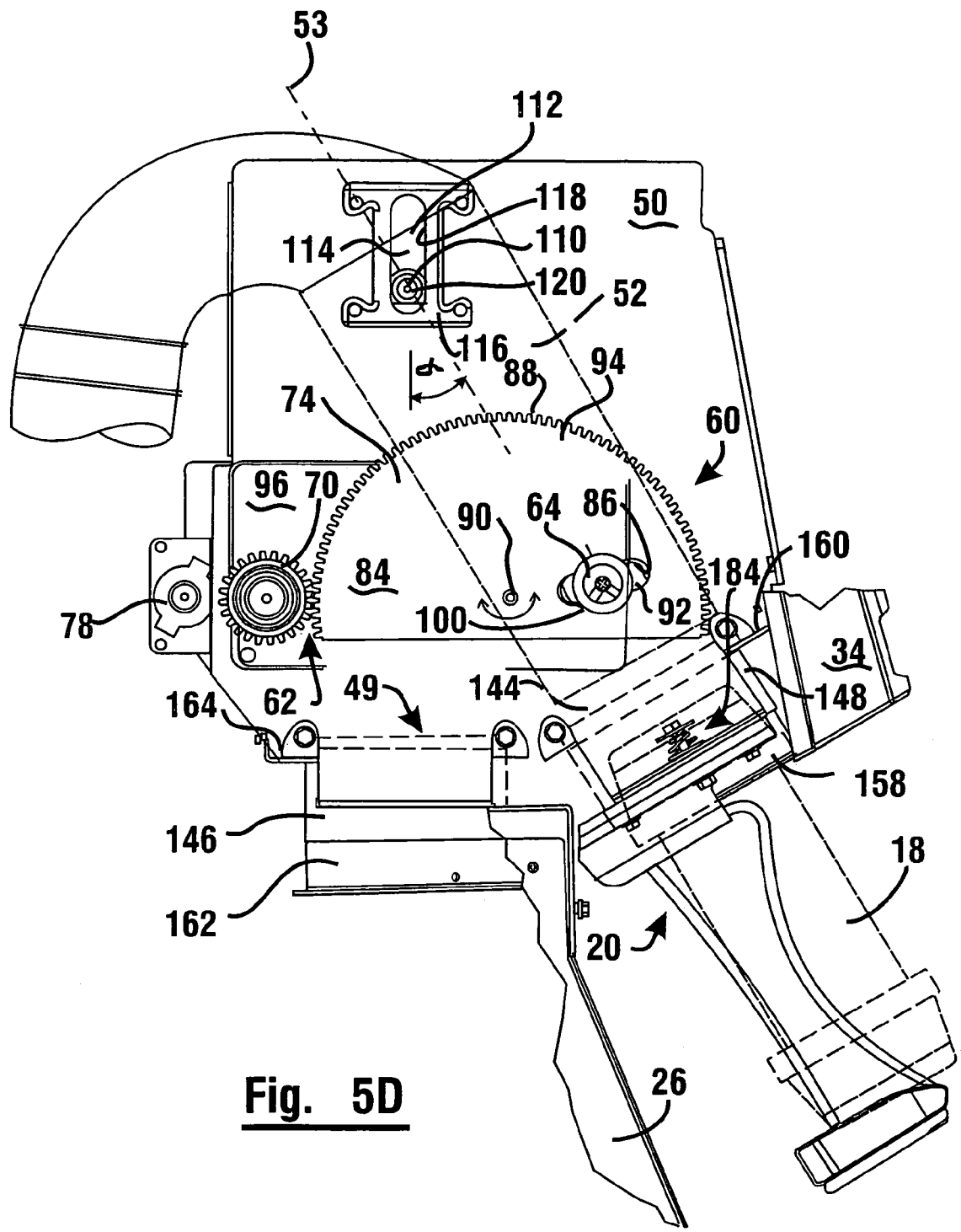

With reference to FIG. 5A, in an exemplary embodiment, cam groove 68 includes a first region 130, a second region 132, and a third region 134. FIG. 5A and FIG. 5B illustrate movement of the cam follower 64 in the first region 130 which provides mostly vertical displacement of the tubular member 52. The initial vertical movement of the tubular member 52 provides sufficient clearance for a circumferential sealing member 144 carried at the lowermost edge of the tubular member to move laterally away from a sealing member 146 disposed at the interface site 49. As illustrated in FIGS. 5B and 5C, movement of the cam follower 64 in the second region 132 causes mostly pivotal movement of tubular member 52. Movement of the cam follower 64 in the third region 134 provides downward angled displacement of tubular member 52, as shown in FIG. 5C and FIG. 5D. In an exemplary embodiment, sealing member 148 is carried on a tubular sleeve 158 mounted in supporting connection with a support plate 160 to facilitate movement of the carrier 18 into and out of the tubular member 52. (See FIG. 3).

The sequence from FIG. 5A to FIG. 5D illustrates the movement of cam follower 64 as it traverses the cam groove in a first manner whereby tubular member 52 moves vertically and pivotally in concerted movement between the first vertical position and the second oblique position. When the cam follower traverses cam groove in a second manner, substantially reverse to the first manner, the tubular member moves vertically and pivotally in concerted movement from the second oblique position to the first vertical position.

In the exemplary embodiment, a sealing member 144 is a generally annular member that extends circumferentially and is mounted in supporting connection with tubular member 52 at the first end 58. As indicated in FIG. 5A, sealing member 144 cooperates with an annular sealing member 146 to operably seal the interface site 49 when the tubular member is engaged therewith in the first vertical position. With reference to FIG. 5D, in the oblique presentation position sealing member 144 cooperates with an annular sealing member 148 to provide an operative seal between tubular member 52 and tubular sleeve 158, as will be discussed in further detail below.

As the tubular member is disposed vertically from the first position by action of the cam follower in the cam groove, the sealing member 144 is disengaged from seal member 146 the interface site 49. In the reverse action, when tubular member is returned to the vertical position, the sealing member 144 again contacts sealing member 146 to operably seal the interface site 49.

With particular reference to FIGS. 2 and 3, in an exemplary embodiment, the pivot assembly 40 further includes a tube extension assembly 150 that is sealingly engaged with tubular member 52 at the upper, second end 112. Tube extension assembly 150 includes a flexible tube and is operable to provide air flow communication between tubular member 52 and an air supply assembly 46 as will be disclosed in greater detail below. In general terms, the air supply assembly 46 is operable to apply and release pressure differentials adapted to move the carrier in the tube of the pneumatic transport system. In an exemplary embodiment, tube extension 150 may include a rigid elbow member 152 and a flexible tube or member 154. This construction is merely exemplary and other constructions may be operable to fulfill substantially the same functions. Flexible tube member 154 permits tubular member 52 to move vertically and pivotally while maintaining a generally airtight connection between the air supply assembly 46 and the pivot assembly 40.

With particular reference to FIG. 3 and FIG. 5D, in an exemplary embodiment, a tubular sleeve 158 is utilized to direct movement of carrier 18 between the tubular member 52 and the carrier cradle assembly 20. When the tubular member 52 is in the second, oblique position, tubular member 52 cooperates with tubular sleeve 158 to form a substantially continuous conduit for passage of the carrier. In this exemplary embodiment, tubular sleeve 158 is mounted in supporting relationship with a support plate 160 that extends between first and second mounting plates 50, 59

In the exemplary embodiment, a longitudinal axis of tubular sleeve 158 is substantially aligned with axis 53 when the tubular member 52 is in the second, oblique position, illustrated in phantom in FIG. 5D. A sealing member 148 is mounted in supporting connection with tubular sleeve 158 to effectuate a generally fluid tight seal between tubular sleeve and tubular member 52 when the tubular member is in the oblique position.

In an exemplary embodiment, a second tubular sleeve 162 is supported by support plate 164 that extends between first and second mounting plates 50, 59. The sealing member 146 at interface site 49 is carried on tubular sleeve 162. In this exemplary embodiment, a longitudinal axis of tubular sleeve 162 is substantially aligned with axis 53 when the tubular member 52 is in the first, substantially vertical position.

In an exemplary embodiment, customer terminal 14 includes a carrier cradle assembly 20 mounted in supporting connection with the pivot assembly 40. In the exemplary embodiment, the cradle assembly 20 is mounted in supporting connection with the mounting plates 50, 59 that also support pivot assembly 40. In this embodiment, the first and second mounting plates each include outwardly directed flanges 172 to which the carrier cradle assembly 20 is mounted. This mounting arrangement is merely exemplary and other mounting arrangements for mounting the carrier cradle assembly 20 are contemplated in other embodiments.

Figure 6A:
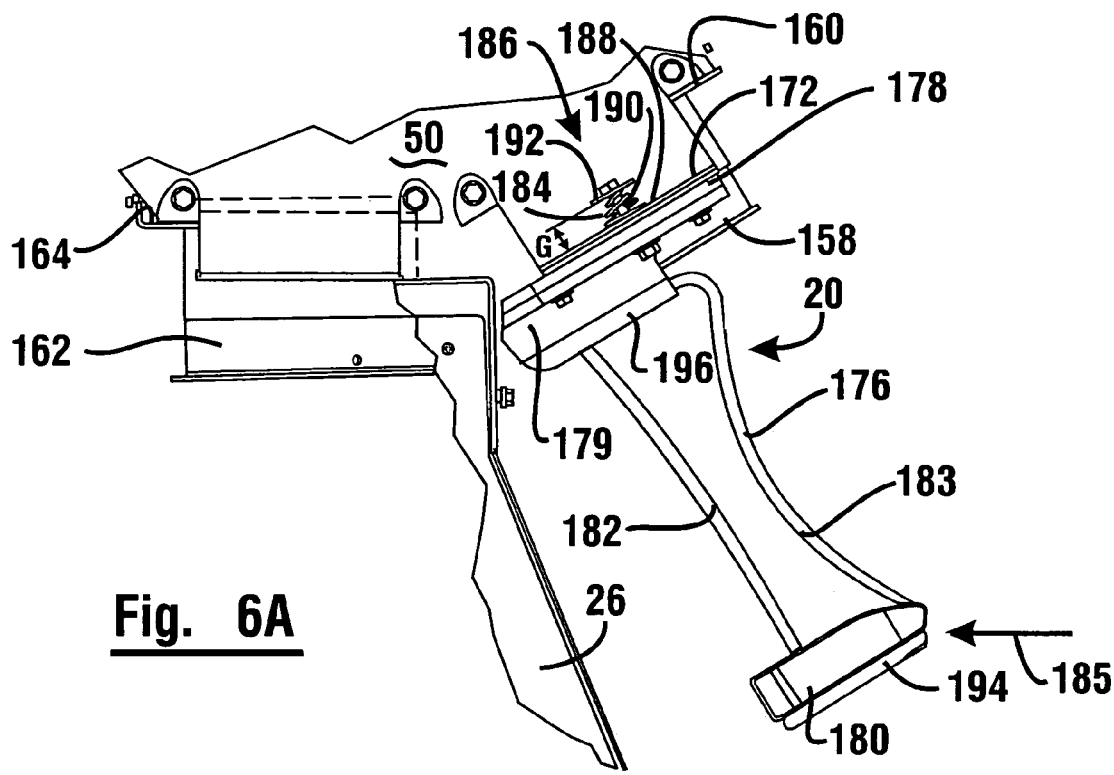
FIGS. 6A-6B are partial side views, partly broken away, of an exemplary customer terminal illustrating the operation of a flex mechanism.
Figure 6B:
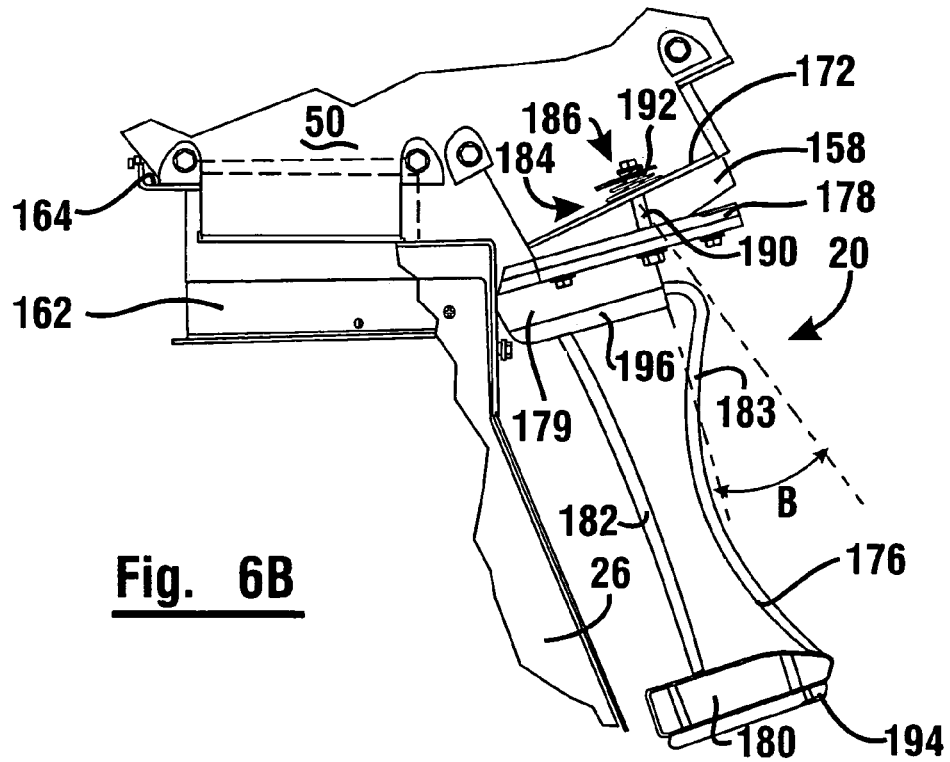

An exemplary carrier cradle assembly 20 is more fully described with reference to FIGS. 6A and 6B. In an exemplary embodiment, the cradle assembly 20 includes a cradle body 176 and a mounting bracket 178. The cradle assembly, which may alternatively be referred to as a cradle is operative to support a carrier in a position where the carrier is manually accessible from outside the terminal. A resilient arrival pad 180 is disposed at the distal end of the cradle body 176 to cushion the descent of the carrier. The exemplary cradle body 176 comprises a lightweight, construction including spaced glides 182, 183 to direct positioning of the carrier 18. In the exemplary embodiment, the forward-most glides 183 are curved toward the frame member 26 to facilitate clearance for protrusions, such as a mirror, on an adjacent user's vehicle. The mounting bracket 178 includes a generally arcuate portion 179 that partially encircles tubular sleeve 158 when the carrier cradle assembly 20 is in an initial position, as shown in FIG. 6A. In the exemplary embodiment, the mounting bracket 178 does not completely encircle tubular sleeve 158 in order to allow operation of a flex mechanism 184 as more fully described below with reference to FIG. 6B.

In an exemplary embodiment, the carrier cradle assembly 20 includes a mounting mechanism for movably attaching the mounting bracket 178 to the pivot assembly. In an exemplary embodiment, the mounting mechanism includes a flex mechanism generally indicated 184. In general terms, the exemplary flex mechanism 184 biasingly holds the cradle body in a position aligned with the tubular sleeve, but is operable to permit a predetermined range of motion of the cradle body 176 relative to the frame 26 to prevent significant structural damage to the customer terminal 14 upon application of relatively minor impact forces. For example, if the cradle body 176 is moved as a result of being struck by an applied force, such as by a vehicle mirror, indicated by arrow 185 in FIG. 6A, the cradle body 176 will deflect from its initial position and rebound after the force is removed without sustaining structural damage, as illustrated in FIG. 6B.

In an exemplary embodiment, the flex mechanism 184 includes a first spring assembly 186 comprising a spring member 188, a pin member 190, and a spring compression member such as a washer 192. In exemplary embodiments, the flex mechanism 184 may include a second spring assembly 186' substantially identical to the first spring assembly 186, and positioned on an opposite side of the cradle assembly (best seen in FIG. 3). As illustrated, in the exemplary embodiment, the distal end 194 of the cradle body 176 is free, i.e., it is not directly supported by other components, thus enabling the flexing movement.

With reference to FIG. 6A, the construction of first spring assembly 186 provides for a predetermined gap, G, between the planar extension 172 and the washer 192. Movement of cradle body 176 relative to the mounting plate 50, such as by contact with a vehicle mirror, causes washer 192 to compress spring member 188, as shown in FIG. 6B. In the exemplary embodiment, about 18 pounds of force will result in the spring member bottoming out, which in the exemplary embodiment corresponds to a shift of up to about 15 degrees of the axis of the cradle body 176, as indicated by angle β. Thus the cradle body can withstand a relatively minor force acting upon it without breakage due to the presence of the flex mechanism. Upon removal of the force, the spring member rebounds and the cradle body is returned to its initial position.

In an exemplary embodiment, the carrier cradle assembly 20 may include a break-away feature including at least one frangible portion, whereby a force greater than a threshold value exerted on the cradle body 176 causes the mounting bracket 178 to break before the pivot assembly or other pneumatic transport system components sustain significant structural damage. In the exemplary embodiment, the mounting bracket 178 comprises a frangible portion which is also referred to as a frangible member 196 which is adapted to interface with the cradle body 176. In an exemplary embodiment, frangible member 196 comprises a layer of plastic material that retains the uppermost end of the cradle body 176. Of course this frangible portion and structure is merely exemplary. Frangible member 196 is operable to fracture under force before the mounting plates 50, 59 or the planar extensions 172 break or permanently deform. In the exemplary embodiment, the threshold value for fracture of the frangible member is about 300 pounds. If enough force is directed to the cradle body 176, the frangible member 196 fractures and releases cradle body 176 from the remaining structure of the customer terminal. After such an occurrence, the exemplary customer terminal may be readily repaired by removing the remainder of the mounting bracket 178 from the mounting plates 50, 59 and attaching a new carrier cradle assembly 20 in its place. Thus, damage to the impact object, such as a user's vehicle, and to the customer terminal is limited.

In an exemplary embodiment of a pneumatic transport system 10, the customer terminal 14 is adapted for use in new construction applications as well as retrofit applications. In the exemplary embodiment, the air supply assembly 46 which operates to apply differential pressure to the pneumatic transport system, includes a single blower assembly 200 situated within the customer terminal 14. In an exemplary embodiment, shown in FIGS. 7A and 7B, frame 26 of customer terminal 14 includes a bottom mount plate 210 having forward and rearward open regions 212, 214, respectively. The exemplary customer terminal 14 is operable to selectively receive the customer end 16A (not shown) of the pneumatic transport tube 16 through either the forward open region 212 or the rearward open region 214.

The frame 26 includes a forward wall portion 220 and a rearward wall portion 222. The forward wall portion 220 comprises a first blower housing mounting site 226 and the rearward wall portion 222 comprises a second blower housing mounting site 228. Each site includes suitable holes, clips or other fastener portions that enable mounting the blower housing at the site. The blower housing 230 is selectively mounted to the frame member 26 depending upon where the customer end 16A of the pneumatic tube is located. If the customer end 16A is received through the forward open region 212, the blower housing 230 may be mounted in supporting connection with the rearward wall portion 222 at the second mounting site 228, as illustrated in FIG. 7B. Alternately, if the customer end 16A is received through the rearward open region 214, the blower housing 230 may be mounted in supporting connection with the forward wall portion 220 at the first mounting site 226. In the exemplary embodiment, the interface site 49 with the pivot assembly remains the same regardless of the position of customer end 16A, and the components carried in the upper region of frame member 26 occupy similar positions regardless of the placement of the blower housing 230. The tube segment 48 that extends between the interface site 49 and the customer end 16A is appropriately configured, which may be through the use of flexible or segmented tubing.

In an exemplary pneumatic transport tube system 10, the carrier 18 is moved throughout the system responsive to operation of a blower motor which is part of an air supply assembly 46. With reference to FIG. 1, in the exemplary embodiment, the air supply assembly 46 is situated in the customer terminal 14. In an exemplary embodiment, the air supply assembly includes a blower assembly 200, a diverter valve assembly 234, and a tube section 236 extending between the blower assembly 200 and the diverter valve assembly 234. The diverter valve assembly 234 is adapted for operable connection with the tube extension assembly 150 through an opening in the support surface 44. The exemplary blower assembly includes a blower housing 230 and a blower motor 238. In the exemplary embodiment, the diverter valve assembly 234 cooperates with the blower motor 238 to provide first and second pressure differentials to the system 10. When the diverter valve assembly occupies a first configuration, the blower motor operates in a vacuum mode to apply the first pressure differential. When the diverter valve assembly occupies a second configuration, the blower motor operates in a pressure mode to apply the second pressure differential. The exemplary diverter valve assembly 234 essentially directs the air flow out of (vacuum mode) or in to (pressure mode) the pivot assembly via the tube extension assembly.

Figure 8:
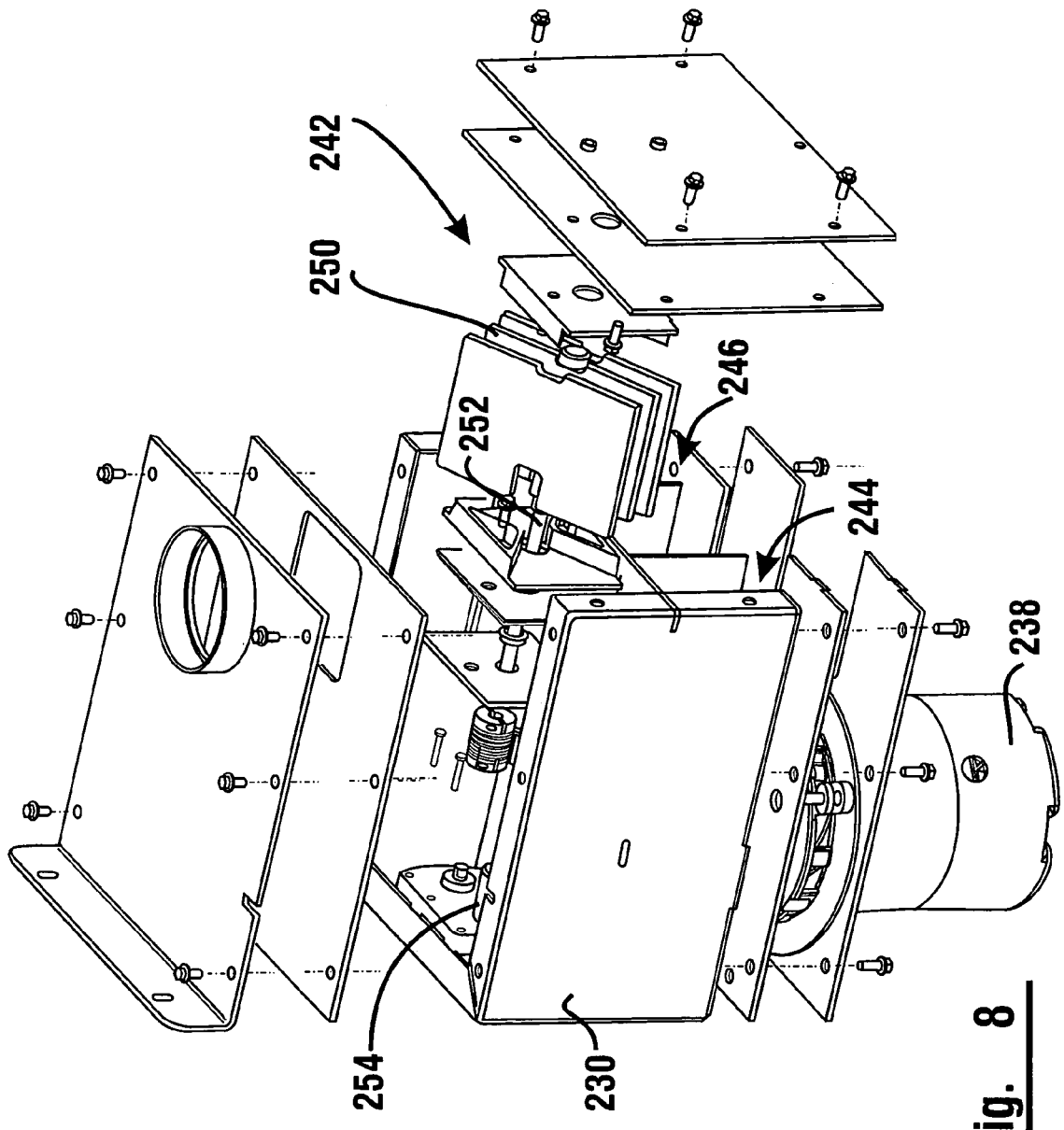
FIG. 8 is an expanded view of one embodiment of a blower assembly having a pivot valve assembly mounted within a blower housing.

In an alternate embodiment, the air supply assembly 46 includes a blower assembly 200 wherein a valve assembly 242 is positioned in a blower housing 230 including at least two chambers 244, 246. The valve assembly 242 directs air flow within the housing through the chambers to alternate the differential pressure applied by the blower between the vacuum mode to positive pressure mode. This alternate exemplary blower assembly is illustrated in FIG. 8. The exemplary valve assembly 242 includes a pivot valve 250 rotatable on a shaft 252 responsive to a motor 254. When the pivot valve 250 is in a first configuration, the blower assembly operates in a vacuum mode to supply the first pressure differential. When the pivot valve 250 is in a second configuration, the blower assembly operates in a positive pressure mode to supply the second pressure differential.

In an exemplary embodiment the cycling operation of the valve assembly 242 between positive pressure mode and vacuum mode may be monitored by a monitoring system including sensors and at least one processor. The cycling of the system may be monitored in accordance with the programming of the processor and provide appropriate outputs in order to anticipate the need for servicing or replacing components. The monitored operations may be compared with predetermined blower fan stress data to calculate and predict the time of an expected future failure. This may be done for example, by sensing and monitoring through appropriate sensors and programming of the processor, parameters such as the number of cycles, differential pressure; absolute pressure, motor speed, fan deformation, strain, vibration and other measurable properties. The at least one processor may operate in accordance with its programming to provide outputs indicative of impending problems or failures. For example in some embodiments, the at least one processor may operate to execute instructions stored in at least one data store which are operative to predict a future failure of the motor, fan blades, valve assembly or other components. In exemplary embodiments the at least one processor may operate to provide one or more outputs to indicate the nature of the probably failure at a time before the failure occurs. This may be done locally by the processor causing an output through an output device such as a local display. Alternatively or in addition, the at least one processor may operate to cause one or more messages to be sent to a remote site concerning the probable future failure and/or the time thereof.

For example in some embodiments, one or more sensors may be used to sense properties which are indicative of failure. These sensors may include for example sensors that sense the current draw of the motor. Further sensors may include pressure sensors that sense the level of pressure or vacuum produced by the blower. In still other embodiments sensors may include sensors operative to detect a level of vibration which exists during operation of the blower. In still other embodiments sensors may include strain sensors that are operative to detect deformation in stationary parts such as motor mounts, or in moving parts such as fan blades. Of course these sensors are exemplary of the types of sensors that may be used.

In some embodiments the sensors may be operatively connected through appropriate interfaces to the processor. The one or more computer programs executed in the processor may be operative to predict a time of future failure based on data corresponding to the sensed parameters. For example, values such as the number of cycles that a unit undergoes, stress and strains sensed in components, vibratory properties, and the level of pressure and vacuum produced along with changes in these sensed properties over time, may be analyzed. A program which compares current parameters to those parameters which correspond to current or future failures may cause the processor to provide one or more signals indicative of a probable failure of one or more components associated with the blower assembly at a particular time in the future. This information may be checked periodically by a technician or may be provided by the at least one processor automatically.

In some embodiments the at least one processor may also be programmed to sense changes which are indicative of a current or near current failure. Such changes may be associated with a single parameter or combinations of multiple parameters. In such embodiments the at least one processor may be operative in accordance with its programming to carry out program steps. Such program steps may include for example, providing outputs and notifications either locally or remotely to servicers. Alternatively or in addition the at least one processor may change the operation of the system to reduce the risk of serious damage such as by modifying operation of certain components. Alternatively and/or in addition, the at least one processor may operate to shut down operation of the system or certain components as appropriate. Of course these approaches are exemplary.

Also, in alternative embodiments the at least one processor may operate in accordance with its programming to control motor speed. For example, the speed of the motor may be varied prior to switching between vacuum and pressure mode to reduce stress on the fan blades.

For example as can be appreciated, switching the valve mechanism between the pressure and vacuum modes may in some embodiments cause stress on fan blades and other air moving components. In situations where the degree of force is changed rapidly the change may act as a shock or impact force which deforms the blades and may eventually hasten failure. In some embodiments the at least one processor may operate in accordance with its programming to reduce such forces by changing motor speeds as appropriate to minimize the adverse impacts of such loading. This may include for example reducing motor speeds during changes in valve conditions so as to reduce the amount of shock loading and deformation of fan blades or other structures. Alternatively and/or in addition the at least one processor may operate to control fan speed so that it corresponds to certain frequency parameters of the system so as to reduce the stresses that are applied. In still other embodiments the at least one processor may operate to trim the air flow and tailor the rates of flow as appropriate for the particular position and/or movement of the carrier at a particular time. This may include for example, initially operating so that there is less differential pressure force pushing the carrier downward in the tube as the carrier will tend to move downward by gravity. However, the at least one processor may operate to increase air flow and/or pressure force as necessary to move the carrier around a bend and/or horizontally through the pneumatic tube run as the carrier moves toward the other terminal. Of course these approaches are exemplary and in other embodiments other approaches may be used.

In still other exemplary embodiments the blower motor 238 may be a switched reluctance blower motor such as an Infin-A-tek® motor available from Ametek Inc., Lamb Electric Division, Kent, Ohio. The switched reluctance blower motor may offer advantages over brush-type motors used in some pneumatic transport systems. For example, traditional brush motor blowers provide approximately 500 hours of blower life, whereas the exemplary switched reluctance blower motor offers approximately 6000 hours of blower life. In other embodiments of the pneumatic transport system conventional blower motors may be utilized to provide the necessary pressure differentials to the system.

Figure 9:
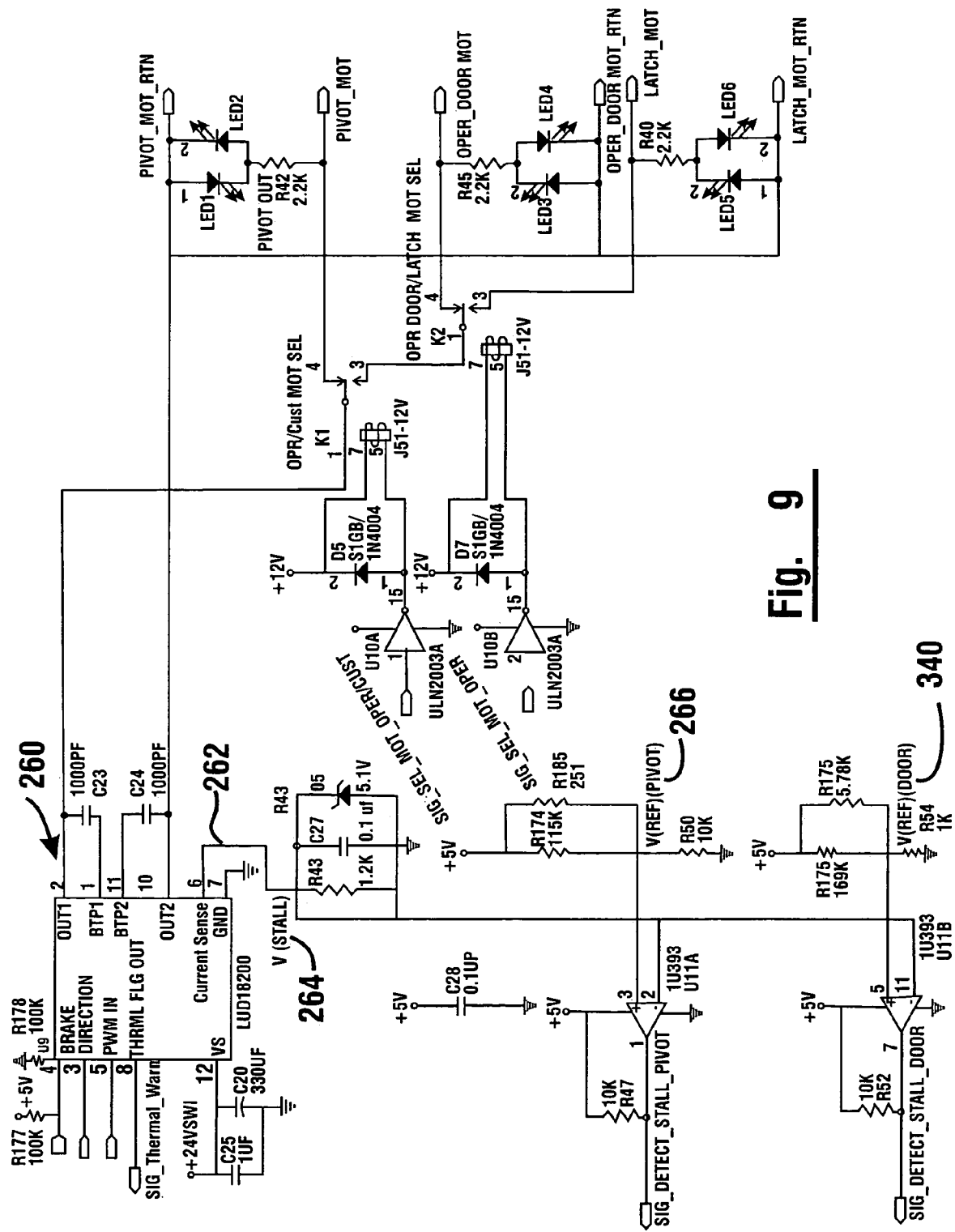
FIG. 9 is a schematic representation of a control circuit.

With reference to FIG. 9, in an exemplary embodiment of customer terminal 14, in the pivot assembly 40, the pivot motor 78 is operable to rotate driver 70 which acts on driven member 74 to move cam follower 64 within cam groove 68. The pivot motor 78 is operable in first and second angular directions to ultimately direct movement of the cam follower 64. In the exemplary embodiment, pivot motor 78 is operably connected with an H-bridge motor control integrated circuit (IC), generally denoted 260, with current sense output 262 to detect and indicate a stall condition of the pivot motor 78. In the exemplary embodiment, the pivot stall detection circuit sensitivity is 377 µA per Amp. When the current sense output 262 exceeds 1318 µA (3.50 Amp motor current), V(stall) 264, will exceed V(Ref)(Pivot) 266, which in the exemplary embodiment is 2.90 V DC. As will be explained in further detail below, in exemplary embodiments, the current sense output 262 may also be utilized to detect a stall condition in the motor that operates the door assembly of the operator terminal.

Figure 10:
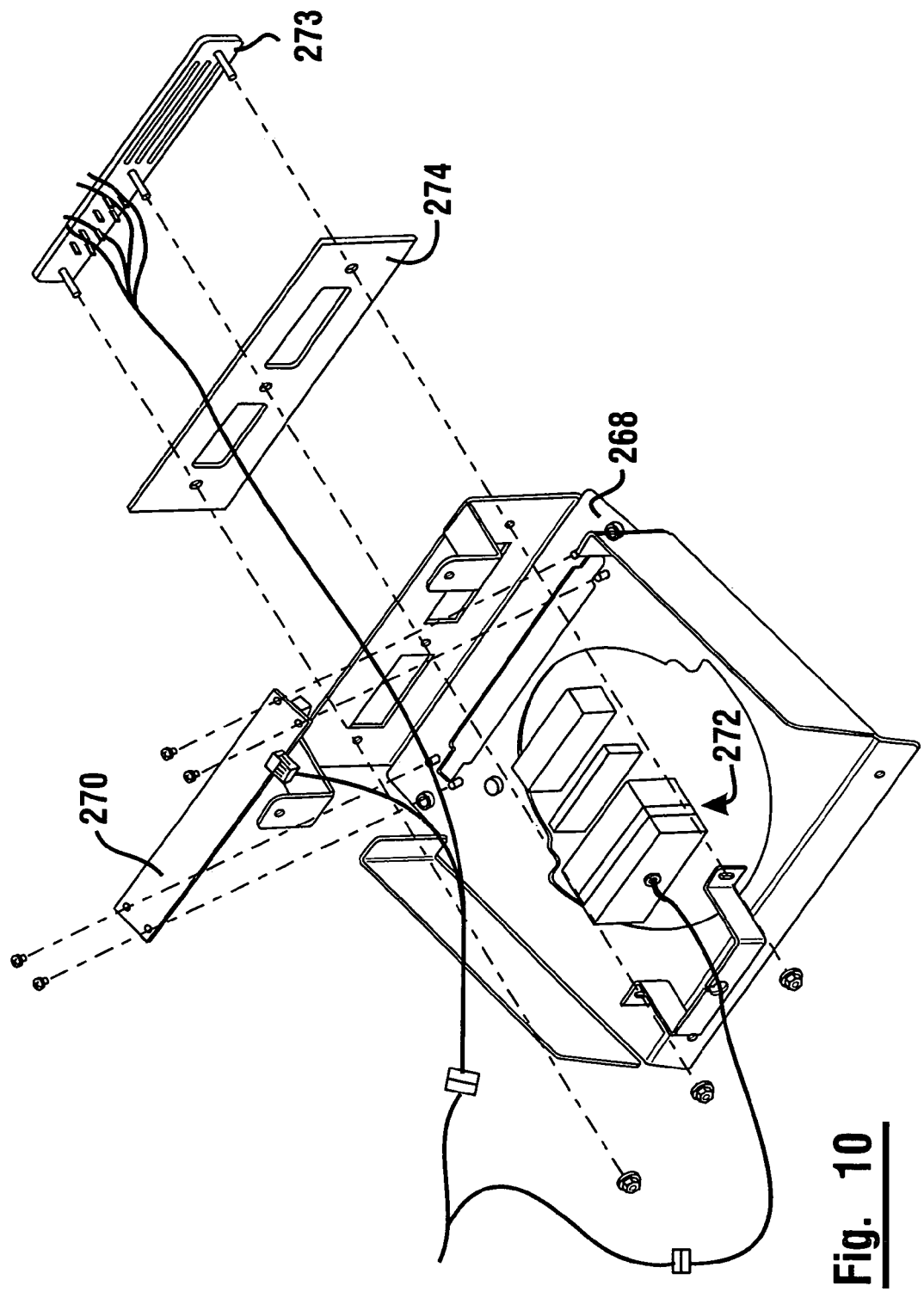
FIG. 10 is an expanded view of an exemplary support plate showing a hand sensor.

An exemplary embodiment of a customer terminal 14 may also include a support plate 268 as shown in supported connection with the pivot assembly 40 in FIG. 2 and in greater detail in FIG. 10. An infrared (IR) hand sensor 270, as will be explained in further detail below, may be supported on support plate 268. Other components such as a microphone assembly 272, an instrument panel 273, and a call/send sensor plate 274 may be supported on the support plate 268 as well. Instrument panel 273 supports electronic connections to provide call and send functions as will be explained in greater detail below.

Figure 11:
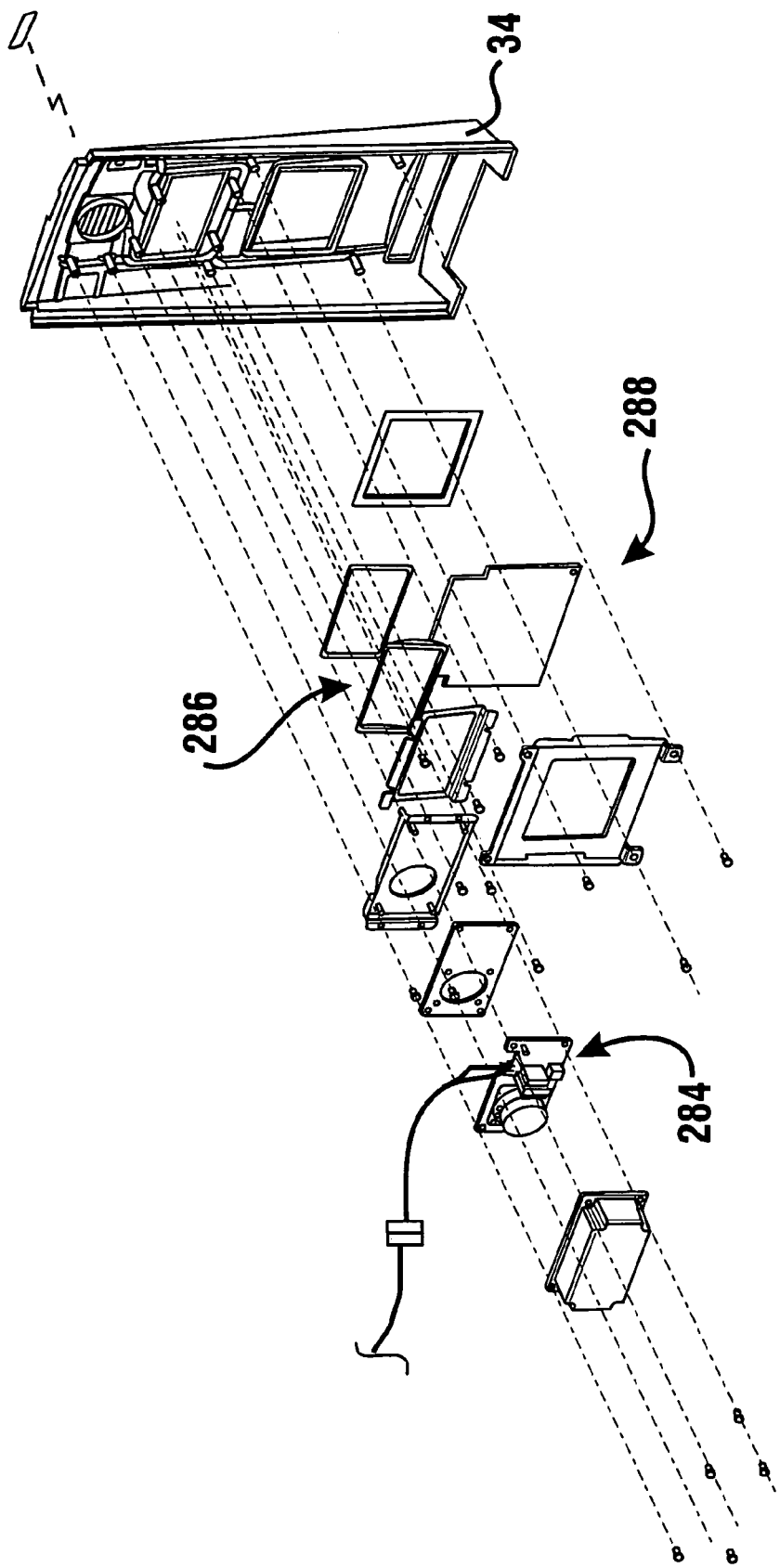
FIG. 11 is an expanded view showing exemplary interactive components of an exemplary customer terminal.
Figure 12:
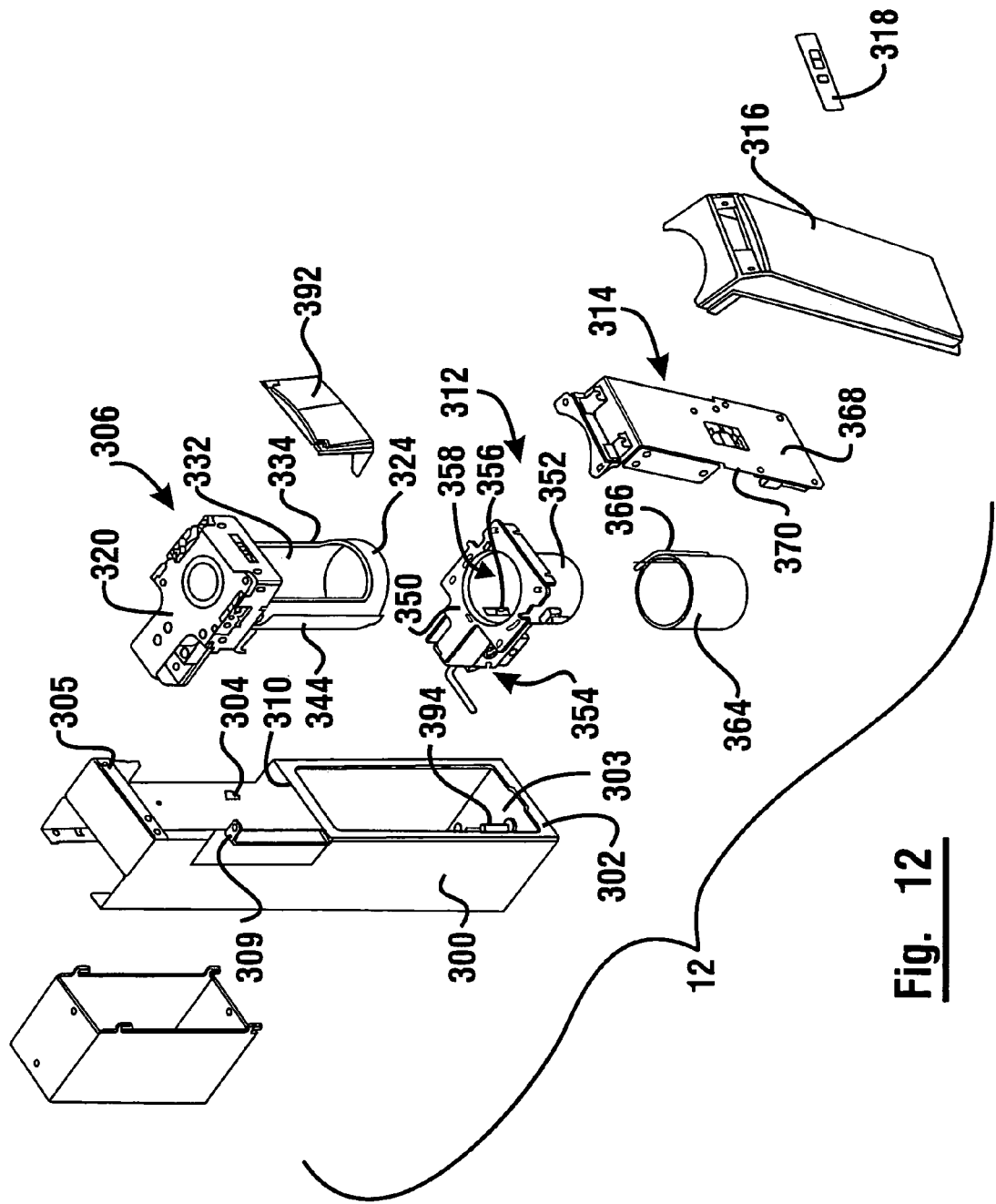
FIG. 12 is an expanded view of an exemplary embodiment of an operator terminal.

With reference to FIGS. 1 and 11, an exemplary customer terminal 14 includes a front fascia 34 to cover certain components. The exemplary customer terminal 14 includes a speaker assembly 284, a camera assembly 286, and a video display assembly 288. These components enable interaction between a user and an operator or teller at a remote location.

With reference to FIGS. 12-15, an exemplary embodiment of the pneumatic transport system includes an exemplary operator terminal 12 comprising a different construction than the customer terminal. In the exemplary embodiment, operator terminal 12 is situated within a bank or other financial institution at a position remote from a customer terminal and is operated by a teller or other bank employee, to selectively transport a carrier between the customer terminal and the operator terminal. The customer terminal may be of the type previously described herein, but other customer terminals may be used in systems with the exemplary operator terminal. As previously mentioned a banking application is merely exemplary of transaction environments in which such systems may be used.

An exemplary embodiment of the operator terminal 12 includes a frame 300 having a front surface 302 disposed toward a front of the operator terminal. Frame 300 includes a bottom open region 303 adapted to receive the operator end 16B of the pneumatic transport tube 16 (See FIG. 1). Access to a carrier 18 is provided through a carrier access opening 304 in an upper region of the frame member. Frame member 300 includes an upper mounting surface 305 for supporting a door assembly 306, and planar flanges 309 and a front edge 310 for supporting a catch assembly 312, as will be explained in greater detail below.

In general terms, the operator terminal 12 includes a door assembly 306, mounted in supporting connection with the frame 300 to selectively open and close the access opening 304. The exemplary operator terminal 12 also includes a catch assembly 312 mounted in supporting relation with the frame 300 immediately below the door assembly 306. When the carrier 18 is received into the exemplary operator terminal 12, the catch assembly 312 is operable to selectively prevent downward movement of the carrier. The exemplary operator terminal also includes a panel assembly 314 which comprises one or more operator terminal components. In the exemplary embodiment, the panel assembly is selectively movable relative the front surface 302 of the frame 300 as will be explained in further detail below.

The exemplary operator terminal 12 further includes a front fascia 316 to provide an attractive appearance to the terminal and to cover certain elements of the operator terminal. Control and input devices such as call and send buttons, as well as an on/off switch may be supported on an instrument panel 318. Of course these devices are exemplary.

An exemplary embodiment of door assembly 306 includes a support frame 320 comprising frame elements 320a, 320b, 320c, 320d, and 320e. Support frame 320 is mounted to frame 300 by joining 320c to upper mounting surface 305. Door assembly 306 includes a door drive mechanism 322 and a door member 324. Door member 324 is selectively rotatable about a vertical axis 326 responsive to the drive mechanism 322 between an open position, shown in FIG. 15 and a closed position, shown in FIG. 1 to thereby selectively open and close the access opening 304.

In the exemplary embodiment, the door member 324 comprises a generally open-ended cylindrical body 332 having an elongated opening 334 therein. When the door member is in the open position, the opening 334 is disposed toward the front of the operator terminal 12 and when the door member 324 is in the closed position the opening 334 is disposed away from the front of the operator terminal.

Figures 13, 15:
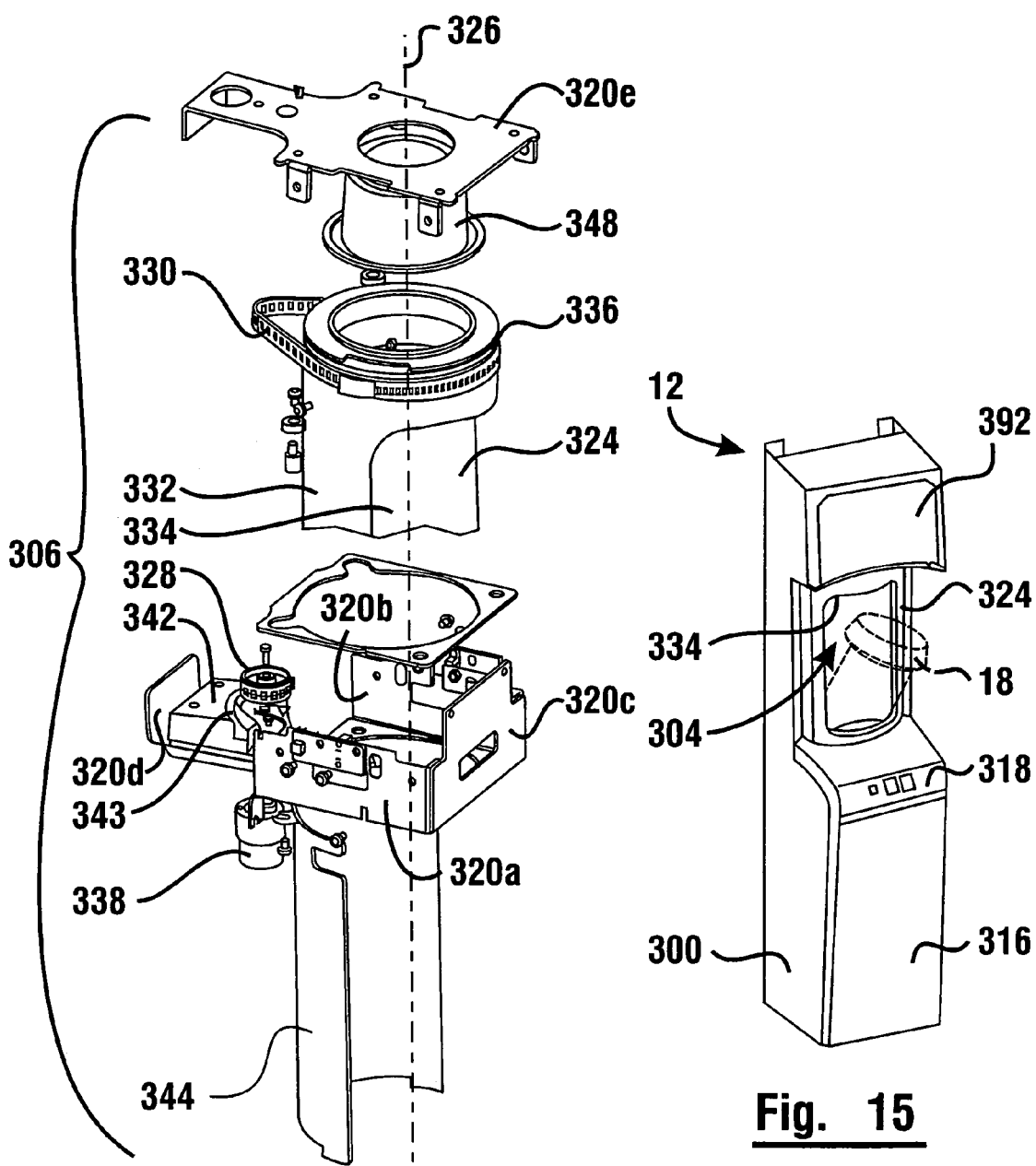
FIG. 13 is an expanded view of an exemplary embodiment of a door assembly.
FIG. 15 is an isometric view of an exemplary operator terminal.
Figure 14:
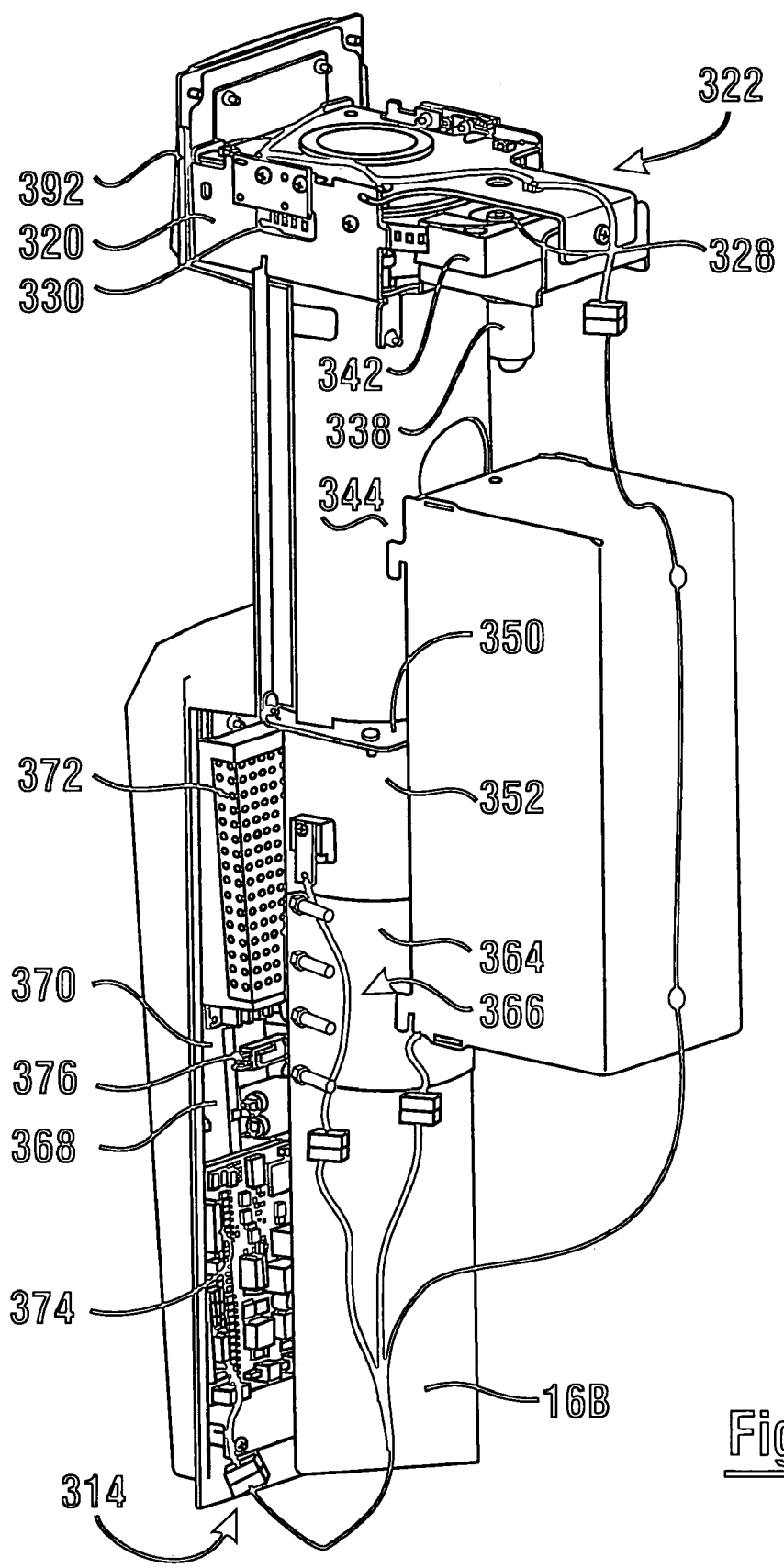
FIG. 14 is a rear isometric view of an exemplary embodiment of an operator terminal absent the frame member.

In the exemplary embodiment, the drive mechanism 322 includes a sprocket member 328 that is rotatable about an axis generally parallel to the vertical axis 326 of the door member 324. A drive tape 330 engages the sprocket member 328 and circumferentially engages the door member 324, as illustrated in FIG. 13. In the exemplary embodiment, the drive tape 330 is securely fixed to the door member 324 and extends in a circumferential groove 336 formed in the door member 324 near an upper end thereof, although other constructions may be used in other embodiments.

The sprocket member 328 is operatively connected to a motor 338 that is operable to selectively drive the sprocket member 328 in forward and reverse angular directions in order to move the door member 324 between the open and closed positions. With reference again to FIG. 9, in an exemplary embodiment, the motor 338 is operably connected with an H-bridge motor control integrated circuit (IC) with current sense output 262 to detect a stall condition of the motor 338. The IC may be similar to that used to detect and provide at least one output indicative of a stall condition of the pivot motor 78. In the exemplary embodiment, the door stall detection circuit sensitivity is 377 µA per Amp. When the current sense output 262 exceeds 346 µA (0.92 Amp motor current), V(stall) 264 will exceed V(Ref)(Door) 340, which in the exemplary embodiment is 0.76V.

To facilitate movement of the drive tape 330, the exemplary drive mechanism 322 includes a guide block member 342 adjacent the sprocket member 328 that includes an arcuate groove 343 therein. The drive tape 330 is slidable within the groove 343.

The exemplary door assembly 306 may also include a door back member 344 mounted in supporting connection with the support frame 320 and disposed generally rearwardly of the door member 324. The back door member 344 comprises an arcuate body adapted for adjacent relationship with the door member 324. In the exemplary embodiment, the door back member is dimensioned to cover the elongated opening 334 when the door member 324 is in the closed position.

The exemplary door assembly 306 may also include an arrival pad 348 comprised of resilient material and disposed in the interior of the door member 324 at the upper end to cushion the arrival of the carrier 18 within the operator terminal 12.

In the exemplary operator terminal 12, the catch assembly 312 may include a support element 350 which incorporates a tubular portion 352. The tubular portion is in flow communication with the operator end 16B of the pneumatic transport tube and is dimensioned for passage of the carrier 18 therethrough. The catch assembly 312 includes a catch mechanism 354 to selectively support and maintain carrier 18 in a user accessible position in the operator terminal 12.

Catch mechanism 354 includes a movable catch member 356 operative to selectively extend inwardly into an interior 358 of the tubular portion 352. In an exemplary embodiment, the catch member 356 is movable responsive to operation of a solenoid 360 mounted in supporting connection with support element 350. Generally planar support flanges 309 disposed at the rear of frame member 300 are utilized to hold support element 350. A front portion of support element 350 is adapted to rest on a front edge 310 of the frame member 300. In the exemplary embodiment, support element 350 also supports door back member 344.

In the exemplary embodiment, the operator terminal also includes an adjustable coupling sleeve 364 which operates to connect the tubular portion 352 with the operator terminal end 16B of the pneumatic transport tube. In the exemplary embodiment, the coupling sleeve 364 includes an adjustment mechanism 366 so that the diameter of the coupling sleeve 364 may be adjusted for ease of selective operative connection of the tubular portion 352 of the catch assembly 312 with the operator end 16B.

In an exemplary operator terminal 12, an exemplary panel assembly 314 includes a component panel 368 having a mounting surface 370 which is rearwardly disposed when the component panel 314 is selectively positioned in the operational position. The operator terminal 12 includes one or more components that are carried on the component panel 368. The components may include, for example, a power supply assembly 372, a control circuit 374, line filters 370, and other components such as power cords and circuit breakers. Various wires, cables or other connecting devices extend from the component panel 368 to sensors, detectors, motors, solenoids, and the like, as used for operation of the system. In the exemplary embodiment, the operator terminal 12 includes a cable connection extending between the control circuit 374, and a controllable mechanism, such as door drive mechanism 322. Other controllable mechanisms may include the catch mechanism 354. In the exemplary embodiment, the operator terminal includes a plurality of cable connections extending from the control circuit to the various controllable mechanisms.

The exemplary operator terminal 12 includes a front fascia 316 that covers the component panel 368. In the exemplary embodiment, front fascia 316 is releasably secured to the component panel 368 at an upper end and selectively secured to the frame member 300 at a lower end.

In the exemplary embodiment, certain components carried on the component panel 368 such as the control circuit 374 and power supply assembly 372 are not accessible from the front of the operator terminal 12 when the panel assembly 312 is in the operational position. However, when the panel assembly 312 is in the service position, removed from close adjacent position with the frame member 300, the components are accessible from the front of the operator terminal for servicing, replacement, and routine maintenance.

The exemplary embodiment of the operator terminal 12 further includes a top cover 392 removably mounted in supporting connection with the frame member 300 in a covering relationship with the support frame 320.

In the exemplary embodiment, frame 300 is generally open at the bottom end to accommodate the operator terminal end 16B. The exemplary embodiment may include a plurality of adjustable leg levelers 394 mounted to a bottom surface of the frame 300. Of course these structures are exemplary.

In accordance with an exemplary embodiment, there is provided a method for operating a pneumatic transport system 10. The method includes operating a pivot assembly 40 of an up receive/down send customer terminal 14 to place a tubular member 52 into a first substantially vertical position axially aligned and in operative connection with a customer terminal end 16A of a pneumatic transport tube 16, so that a carrier 18 can be received through a first open end 58 of the tubular member 52. In a usual scenario, the first vertical position is the default position for the tubular member 52.

The exemplary method includes operating an air supply assembly to apply a first pressure differential across the carrier 18 to move the carrier 18 in a vertically upward direction from the pneumatic transport tube into the tubular member 52 and then to maintain the carrier 18 in the tubular member 52. The application of the first pressure differential may be initiated by a user activating a "call" button on a user interface on the customer terminal. Alternately, the action may be initiated by an operator, or teller, activating a "send" button on an operator terminal. The first pressure differential relates to operation of the control circuitry responsive to the at least one user input, causing the air supply assembly, housed in the customer terminal, to operate in a vacuum mode. This operation lowers the pressure ahead of the carrier which causes the ambient air pressure to act behind the carrier to move it through the transport tube and into the tubular member 52.

In the exemplary method, the tubular member 52, with the carrier 18 inside, is vertically and pivotally displaced in concerted motion from the first substantially vertical position to a second oblique position. In the second position of exemplary embodiments, the longitudinal axis of the tubular member 52 is disposed at an angle between 25°-35° to the vertical. The first pressure differential maintains the carrier 18 within the tubular member 52 as it is moved between the vertical position and the angular position which corresponds to a presentation position. As the tubular member 52 is moved, a sealing member 144 that is circumferentially disposed at the lower end of the tubular member 52, is disengaged from operable connection with the transport tube at an interface site 49.

After the tubular member 52 has moved to the second position, the first pressure differential is no longer applied responsive to operation of the control circuitry. The carrier 18 is thereby allowed to drop responsive to gravity in an angled downward direction from within the tubular member 52 to a position so that it is accessible to a user from outside the tubular member 52. The carrier 18 may descend through the tubular sleeve 158 and be supported with a carrier cradle assembly 20 in the presented position. In the exemplary embodiment, an uppermost portion of the carrier 18 may be retained in the tubular sleeve 158 when it is in the presentation position. When the tubular member 52 is in the second, oblique position, the sealing member 144 carried on its lower end is sealingly engaged with the tubular sleeve 158, or with a sealing member 148 carried on the tubular sleeve 158. Of course this approach is exemplary.

The carrier 18 may be removed from the carrier cradle assembly 20 by a user in order for the user to perform a transaction activity. This may include for example, placing items inside, removing items from, or inputting data or receiving output data from the carrier. To continue the transaction, the carrier 18 is returned to the presented position in supporting connection with the cradle assembly. In the exemplary embodiment the carrier is positioned by the user such that the upper end of the carrier body extends in the tubular sleeve 158 with the outer circumference of a seal supported on an upper end of the carrier body generally in circumferential engagement with the inside diameter of the sleeve. This enables the carrier to be moved from the presented position responsive to the application of differential pressure.

The exemplary method further includes operating the air supply assembly 46 to again apply the first pressure differential across the carrier 18 to move the carrier 18 in an angled upward direction from the presented position into the tubular member 52 and to hold the carrier 18 in the tubular member 52. This includes drawing a vacuum in the area on top of the carrier so that ambient air pressure moves the carrier into tubular member 52. Operation of the air supply assembly 46 to provide the first pressure differential may be commenced by the user pressing a "send" button of the user interface. In an exemplary embodiment the control circuitry may operate so that the application of the pressure differential may be slightly delayed in order to allow the user sufficient time to retract his or her hand. An infrared (IR) hand sensor 270 may operate to sense objects adjacent to the carrier and in conjunction with control circuitry may operate to prevent application of the first pressure differential until the user's hand is no longer detected. Of course, other or additional sensing means may be utilized in other embodiments. Alternately, the operator, or teller, may operate the air supply assembly 46 by activating a "call" button on the operator terminal 12.

The exemplary method includes substantially reversing the operation of the pivot assembly 40 from that previously described so that the tubular member 52 is vertically and pivotally displaced in concerted motion from the second oblique position to the first substantially vertical position.

With the tubular member 52 in the vertical position the air supply assembly 46 is operated to apply a second pressure differential across the carrier 18. This positive pressure moves the carrier 18 in a vertically downward direction from within the tubular member 52 and into the pneumatic transport tube 16. The second pressure differential is maintained so that the carrier 18 is moved through the horizontal run of the pneumatic transport tube and vertically upward into a remote operator terminal 12 in operative connection with an operator end 16B of the pneumatic transport tube 16. In this exemplary embodiment a positive pressure is applied behind the carrier so that the carrier moves in response thereto to the operator terminal.

In the exemplary method, a catch mechanism 354 of a catch assembly 312 in the operator terminal 12 is selectively operated to prevent the carrier 18 from moving downward within the operator terminal once it has reached an operator accessible position therein. When the carrier is sensed by a suitable sensor in the operator accessible position the control circuitry operates so that the application of the second pressure differential is removed. A door assembly 306 is then operated in order to selectively open a carrier access opening 304 in the operator terminal.

In the exemplary embodiment the operation of the catch mechanism 354, the removal of the second pressure differential, and operation of the door assembly 306 may be performed responsive to the control circuitry in automated coordination. The catch mechanism 354 may operate responsive to detection of the arrival of the carrier 18 within the terminal by a suitable contact or contactless sensor to cause a catch member 356 to extend inwardly into a tubular portion 352 of a catch assembly 312 beneath the carrier 18. Substantially simultaneously, the second pressure differential may be removed. After detection that the second pressure differential is removed, the door assembly 306 may operate to selectively open the access opening 304. Further, the catch member 356 may bias an upper end of the carrier 18 toward the access opening 304 so that when the access opening is opened, the top of the carrier 18 extends outwardly toward the front of the operator terminal (see FIG. 15). Of course this approach is exemplary.

The operator, such as a teller, may remove the carrier 18 from the operator terminal in order to perform transaction activity. Later, if it is necessary to continue the transaction to send items to the customer at the customer terminal, the operator may place items in the carrier, and place the carrier 18 through the access opening 304 so that the lower end of the carrier 18 contacts the catch member 356.

In the exemplary method, the door assembly 306 is operated responsive to at least one input to an input device to selectively close the access opening by rotating the door member 324 so that the elongated opening 334 is disposed away from the front of the operator terminal. The first pressure differential is thereafter applied across the carrier 18. Substantially simultaneously, the catch mechanism 354 is operated to move the catch member 356 away from the interior of the tubular portion 352, freeing the carrier 18 for downward movement within and out of the operator terminal 12. This activity may be carried out by the control circuitry responsive to the operator, or teller, activating a "send" button on the operator terminal. Alternately, this activity may be commenced by a user activating a "call" button on the customer terminal. The carrier 18 is transported through the pneumatic tube and received within the customer terminal. The pivot assembly 40 is then operated as earlier described to move the tubular member 52 from the first (vertical) position to the second (angled) position to present the carrier to the user.

Operation of the exemplary pivot assembly 40 includes moving a driver motor 78 in a first angular direction and rotating a driver or sprocket 70 responsive to the motor 78. The driven member 74 is rotated responsive to the rotation of the driver 70. A cam follower 64, in supporting connection with the tubular member 52 and extending through a drive slot 92 in the driven member 74, traverses a cam groove 68 in a first manner responsive to rotation of the driven member 74. In concerted movement with the cam follower 64, the pivot pin 110 in supporting connection with the tubular member 52 rides in a vertical opening 114 in a mounting plate 50. As the cam follower 64 traverses the cam groove 68, the tubular member 52 is vertically and pivotally displaced from the first position to the second position.

In the exemplary method, the movement of the tubular member 52 is substantially reversed responsive to the control circuitry, by driving the driver motor 78 in a second angular direction, and causing the driver 70 to rotate in a reverse manner. The driven member 74 rotates responsive to the driver 70, causing the cam follower 64 to traverse the cam groove 68 in a second manner, substantially reverse to the first manner. The pivot pin 110 rides in the vertical opening 114 in concerted movement with the cam follower 64, whereby the tubular member 52 is vertically and pivotally displaced between the second position and the first position.

An exemplary method includes controlling and monitoring the driver motor 78 with an H-bridge motor control integrated circuit 260 comprising a current sense output 262 operative to detect a stall condition in the driver motor 78. In exemplary embodiments the control circuitry is operative responsive to detecting the stall condition to discontinue supplying power to the motor which prevents damage to the motor or other connected components. Further, in some exemplary embodiments the control circuitry may be operative to send one or more signals which cause a local or remote output indicating the malfunction. In still other embodiments the control circuitry may take other appropriate corrective action. This may include for example reversing the direction of the motor in an attempt to release the mechanism from the stall condition. Of course these approaches are exemplary and in other embodiments other approaches may be used.

In an exemplary method, operation of the air supply assembly 46 includes utilizing a diverter valve assembly 234 in a first configuration to provide the first pressure differential wherein a blower motor 238 is operated in a vacuum mode. The diverter valve assembly 234 is operated in a second configuration to provide the second pressure differential wherein the blower motor 238 is operated in a pressure mode.

In an alternate exemplary method, operation of the air supply assembly 46 includes utilizing a valve assembly 242 in a blower housing 230 to alternately operate the blower motor 238 in vacuum and pressure modes. The valve assembly 242 operably pivots between first and second configurations. When the valve assembly 242 is in the first configuration, the blower motor 238 operates in the vacuum mode to supply the first pressure differential. When the valve assembly 242 is in the second configuration, the blower motor 238 operates in a pressure mode to supply the second pressure differential.

In an exemplary method, operation of the door assembly 306 includes driving a door drive motor 338 in a first angular direction and rotating a sprocket 328 responsive to the motor 338. A drive tape 330, operably engaged with the sprocket 328, moves a cylindrical door member 324 from a closed position to an open position. Moving the door member 324 to an open position includes positioning an elongated opening 334 in the door member 324 toward the front of the operator terminal whereby an access opening 304 in the operator terminal is opened. An exemplary method also includes utilizing a guide block 342 having an arcuate groove 343 therein to guide movement of the drive tape 330.

An exemplary method includes controlling and monitoring the drive motor 338 with an H-bridge motor control integrated circuit 260 comprising a current sense output 262 operative to detect a stall condition in the door drive motor 338. In an exemplary method, a similar current sense output 262 is utilized to detect a stall condition in the pivot driver motor 78 and the door drive motor 338. During operation of the driver motor 78 of the pivot assembly 40, the current sense output or V(stall) is compared with a reference voltage V(ref)(pivot) for the pivot driver. When the stall voltage exceeds the reference voltage, a stall alert signal is generated. Likewise, during operation of the door drive motor in the door assembly 306, the current sense output V(stall) is compared with a reference voltage V(ref)(door). When the stall voltage exceeds the reference voltage, a stall alert signal is generated. Of course this approach is exemplary.

In exemplary embodiments the input devices, motors, sensors, circuitry, alarms, devices and other electrical devices are in operative connection with circuitry that includes one or more processors. The processors operate in accordance with program instructions stored in one or more associated data stores to control operation of devices in the system. Computer executable instructions may be stored on a suitable article of media from which such instructions may be programmed and recovered. Such media may include, for example, a hard drive, a floppy disk, a CD-ROM, flash memory, firmware memory or other suitable article. Of course in other embodiments other approaches may be used.

In an exemplary embodiment a method of protecting the customer terminal 14 from substantial physical damage is provided. The method includes mounting a cradle body 176 of a carrier cradle assembly 20 in movable supporting connection relative to the frame member 26 of the up receive/down send customer terminal 14 so that the cradle body 176 occupies an initial position relative to the frame member 26. A force is applied to the cradle body 176 and a flex mechanism 184 is utilized to allow the cradle body 176 to move relative to the frame member 26 responsive to applied force. The amount of displacement of the cradle body 176 is dependent on the exerted force, up to a predetermined maximum displacement. The force is removed from the cradle body 176 and the flex mechanism 184 is utilized to return the cradle body 176 to substantially the initial position.

In an exemplary embodiment a method for protecting the customer terminal from substantial physical damage includes mounting a carrier cradle assembly 20 in supporting connection with a frame member 26 of an up receive/down send customer terminal wherein the carrier cradle assembly 20 includes a cradle body 176 operative to support a carrier 18 in a presentation position and a mounting bracket 178 in supporting connection with the cradle body 176. A force, exceeding a threshold value, is applied to the cradle body 176. A frangible portion or member 196 disposed adjacent the cradle body 176 breaks upon application of the force.

In an exemplary embodiment, a method of preventing substantial physical damage to a customer terminal may include utilizing both a flex mechanism 184 and breaking a frangible member 196.

In an exemplary embodiment, a method of servicing an operator terminal 12 is provided. The exemplary method includes servicing at least one operator terminal assembly from a front of an operator terminal 12. The operator terminal assembly to be serviced is at least one member selected from the group consisting of a door assembly 306, a catch assembly 312, and a panel assembly 314. The exemplary method includes selectively removing a door assembly 306 from supporting connection with a frame member 300 of the operator terminal through a front opening thereof, wherein the door assembly 306 includes a door drive mechanism 322 and a door member 324; selectively removing a catch assembly 312 from supporting connection with the frame member 300 through the front opening, wherein the catch assembly 312 includes a catch mechanism 354 comprising a movable catch member 356; or selectively moving a panel assembly 314 from an operative position to a service position, wherein the panel assembly 314 includes a component panel 368 and at least one operator terminal component mounted in supporting connection with the component panel. After performance of the required service activity, the door assembly 306 or the catch assembly 312 is replaced through the front opening, or the panel assembly 314 is returned to the operable position.

The door assembly 306 may be removed from supporting connection with the frame 300 by removing fasteners that extend between the support frame 320 and the frame 300, and disengaging the door assembly 306 from the catch assembly 312. The support frame 320 may be disassembled in order to provide access to the door drive mechanism 322, including the door drive motor 338, the sprocket 328, and the drive tape 330. The door back member 344 is removably connected to the support frame 320 for ready assembly and disassembly.

In the exemplary service method, the catch assembly 312 may be removed from supporting connection with the frame 300 by removal of fasteners that extend between the support element 350 and the frame 300. The tubular portion 352 of the catch assembly 312 may be disengaged from the coupling sleeve 364 by operation of the adjustment mechanism 366. In the exemplary method, the adjustment mechanism 366 may be accessed from a front of the operator terminal. After removal of the catch assembly 312 from engagement with the frame 300, the catch mechanism 354 including catch member 356 and solenoid or motor 360, may be readily accessed for service or replacement. Alternately, the entire catch assembly 312 may be readily replaced.

In the exemplary service method, the panel assembly 314 may be moved from an operational position to a service position by removal of fasteners that extend between the panel assembly 314 and the catch assembly 312. The fasteners may only be accessible after removal of the front fascia 34 away from the frame 300. The panel assembly 314 may be placed into a service position wherein a mounting surface 370 of a component panel may be accessed from a front of the operator terminal 12.

In the exemplary service method, operator terminal components, such as a power supply assembly 373, a control circuit 374, line filters 376 and connecting cables or wires may be accessed for servicing or replacement when the panel assembly 314 is in the service position.

In an exemplary embodiment there is provided a method for retrofitting a new construction customer terminal onto a stub-out of an existing pneumatic transport system. The exemplary method includes selectively mounting a blower motor housing 230 in supporting connection with a frame member 26 of an up receive/down send customer terminal adapted for operative connection with a customer end of the tube 16A of a pneumatic transport tube 16. The frame member 26 includes a bottom plate 210 having a forward open region 212, and a rearward open region 214. If the customer end 16A is adapted to be received through the forward open region 212 then the blower motor housing 230 is selectively mounted to a mounting site 228 on a rearward wall portion 222 of the frame member. If the customer end of the tube 16A is adapted to be received through the rearward open region 214, then the blower motor housing 230 is selectively mounted to a mounting site 226 on a forward wall portion 220 of the frame member 26. The frame member 26 is situated relative the customer end of the tube 16A so that the customer end is selectively received through the forward open region 212 or the rearward open region 214. An operative connection is then provided between the customer end 16A and the tubular member 52 of a pivot assembly 40 mounted in supporting connection with the frame member 26, wherein the tubular member 52 is adapted to receive a carrier 18 through an open end thereof.

It should be understood that in other alternative embodiments the principles described herein may be used in conjunction with other system types. This may include for example systems which include blowers or other devices for applying differential pressure at each end of the system. For example, provision may be made for applying either negative or positive pressure, or both at each end terminal. This may provide for example, for systems in which a negative pressure is applied in front of the carrier as a positive pressure is applied behind the carrier. This may enable the carrier to move greater loads and/or at faster speeds. Also in some embodiments appropriate sensors and controls may be used to control the differential pressure so that the force and speed of the carrier may be controlled in a manner that is optimal for the particular circumstances.

The devices, methods and principles described herein may be used in conjunction with systems of the type shown in U.S. Pat. Nos. 6,672,807 and/or 6,146,057, the disclosures of which are incorporated herein by reference. Also the described devices, methods and principles may also be applied in connection with systems of the types shown in U.S. patent application Ser. No. 08/889,033 filed Jul. 7, 1997 and/or U.S. patent application Ser. No. 10/390,342 filed Mar. 17, 2003, the disclosures of each of which are also incorporated herein by reference.

While the exemplary embodiments include particular structures to achieve the desirable results, those having skill in the art may devise numerous other embodiments with other structures which employ the same inventive principles described herein and which are encompassed by the subject matter as claimed.

Thus the exemplary embodiments achieve the above stated objectives, eliminate difficulties encountered in the making and use of prior devices, solve problems, and attain the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations herein are given by way of examples and the invention is not limited to the exact details shown and described.

In the following claims any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

The invention claimed is:

1. Apparatus comprising:
   an up receive/down send customer terminal adapted for operative connection with a customer end of a pneumatic transport tube, wherein the customer terminal is adapted to receive a pneumatic tube carrier therein and send a pneumatic tube carrier therefrom, wherein the customer terminal includes:
   an air supply assembly in operative connection with the transport tube, wherein the air supply assembly is operative to selectively apply first and second pressure differentials to the tube, wherein the carrier moves responsive to the first and second pressure differentials, wherein the air supply assembly includes a blower motor and a blower housing; and
   a frame, wherein the frame includes a forward mounting site and a rearward mounting site, each separately adapted to mount the blower housing in supporting connection to the frame at the respective mounting site, whereby the blower housing is mounted at one of the forward or the rearward mounting site responsive to the customer end of the pneumatic transport tube extending in the frame in a manner that prevents mounting of the blower housing at the other mounting site.

2. The apparatus of claim 1 wherein the frame includes forward, rearward, and bottom wall portions, wherein the bottom wall portion includes forward and rearward open regions, and wherein the forward and rearward open regions are each configured to enable the customer end to extend therethrough, whereby when the customer end extends through the forward open region the blower housing is mounted at the rearward mounting site, and when the customer end extends through the rearward open region the blower housing is mounted at the forward mounting site.

3. The apparatus of claim 2 wherein the air supply assembly further comprises:
   a movable valve member, wherein the valve member is movably mounted in operatively supported connection with the blower housing, wherein when the valve assembly is in a first position, the air supply assembly is operative to supply the first pressure differential, wherein the first pressure differential comprises vacuum, and wherein when the valve member is in a second position, the air supply assembly is operative to supply the second pressure differential, wherein the second pressure differential comprises positive pressure.

4. The apparatus of claim 3 further comprising:
   a tubular member movably mounted in operatively supported connection with the frame, wherein the tubular member is operative to receive a pneumatic tube carrier therein through a lower open end, wherein the tubular member is movable both vertically and angularly between a first substantially vertical position wherein the tubular member is in operative engagement with the customer end, a second position upwardly disposed from the first position, and a third position in which the open end is laterally disposed from the open end in the first position of the tubular member.

5. The apparatus of claim 4 wherein the tubular member includes an upper end generally opposed of the lower end, and wherein the frame includes a support surface wherein the tubular member is in operatively supported in connection with the support surface, and wherein the support surface has a plurality of openings therein, wherein the plurality of openings include a first opening wherein an operable connection between the lower end of the tubular member and the customer end of the pneumatic transport tube is made through the first opening, and a second opening laterally disposed from the first opening, wherein the air supply assembly and the upper end of the tubular member are in fluid connection through a fluid conduit extending through the second opening.

6. The apparatus of claim 5 wherein the terminal includes an interface site and further comprising an annular seal mounted at the interface site, and wherein in the first position of the tubular member the open end of the tubular member is operatively engaged with the annular seal.

7. The apparatus of claim 6 further comprising:
   a carrier cradle mounted in operatively supported connection with the frame, wherein the carrier cradle is positioned adjacent the open end of the tubular member when the tubular member is in the third position.

8. The apparatus of claim 7 and further comprising:
   a movement mechanism in operative connection with the tubular member, wherein the movement mechanism is operative to pivotally and vertically move the tubular member between the first position and the second position, and between the second position and the third position.

9. The apparatus of claim 8 and further comprising:
a tubular sleeve, wherein the tubular sleeve is in operatively supported connection with the frame, and wherein the tubular member in the third position is generally aligned with the tubular sleeve, and wherein the tubular sleeve is generally aligned with the carrier cradle.

10. The apparatus of claim 9 wherein the movement mechanism is further operative to move the tubular member between the third position and a fourth position, wherein in the fourth position the lower end of the tubular member is disposed downwardly relative to the open end of the tubular member in the third position.

11. The apparatus of claim 10 and further comprising:
a second annular sealing member mounted in operative connection with the tubular member at the lower end thereof; and
a third annular sealing member mounted in operative connection with the tubular sleeve, wherein when the tubular member is in the first position, the sealing member at the interface site is operatively engaged with the second sealing member, and wherein when the tubular member is in the fourth position, the second sealing member is operatively engaged with the third sealing member.

12. The apparatus of claim 11 wherein the carrier cradle comprises:
a mounting bracket,
a cradle body mounted in operatively supported connection with the mounting bracket, and
a mechanism operative to movably mount the mounting bracket in operatively supported connection with the frame.

13. The apparatus of claim 12 wherein the mechanism includes:
a spring member operative to enable relative motion between the cradle body and the frame.

14. The system of claim 11 wherein the mounting bracket includes:
a frangible portion disposed adjacent the cradle body, wherein the frangible portion is operative to break when a force greater than a threshold force is exerted substantially horizontally on the cradle body.

15. The apparatus of claim 11 wherein the blower housing includes a vacuum chamber and a pressure chamber, and wherein the valve member is movable selectively to direct air flow into the vacuum chamber and out of the pressure chamber.

16. Apparatus comprising:
a downsend pneumatic terminal operative to receive a pneumatic carrier in the terminal and to send a pneumatic carrier from the terminal including
a frame;
an air supply assembly operative to produce at least one of positive pressure and vacuum;
a pair of disposed sites on the frame, each site adapted to independently and exclusively mount at least one component of the air supply assembly in operative supported connection with the frame at the respective site; whereby the at least one component of the air supply assembly is enabled to be mounted selectively at one site that does not interfere with a pneumatic transport tube upwardly extended in the frame.

17. The apparatus according to claim 16 wherein the terminal further includes:
a tubular member, where the tubular member is movably mounted in operatively supported connection with the frame, wherein the tubular member includes an open lower end and an upper end in fluid communication with the air supply assembly;
an interface site, wherein the interface site is in operative connection with a generally vertically extending pneumatic transport tube within the terminal;
a carrier delivery opening adapted to deliver a carrier outside the terminal through the carrier delivery opening;
a mechanism in operative connection with the tubular member, wherein the mechanism is operative to move the tubular member from a first position in which the lower end is in aligned engagement with the interface site, to a second position wherein the lower end is generally vertically disposed from the interface site, from the second position to a third position, wherein in the third position the lower end is laterally disposed from the lower end in the second position, and from the third position to a fourth position, wherein in the fourth position the lower end is disposed downwardly relative to the third position, and wherein in the fourth position the lower end is generally aligned with the delivery opening.

18. The apparatus according to claim 17 wherein the air supply assembly is selectively operative to provide vacuum, and further comprising control circuitry in operative connection with the air supply assembly and the mechanism, wherein the control circuitry is operative to apply vacuum to an upper end of the tubular member to hold a carrier in the tubular member as the mechanism moves the tubular member from the first position, through the second and third positions and to the fourth position, and wherein in the fourth position the control circuitry is operative to no longer apply vacuum to the upper end of the tubular member, whereby the carrier moves downward in the delivery opening.

19. The apparatus according to claim 18 wherein the air supply assembly is selectively operative to produce vacuum and positive pressure,
and wherein the control circuitry is operative to cause vacuum to be applied to the upper end of the tubular member to move a carrier extending in the delivery opening into the tubular member, and to move the tubular member with the carrier therein, from the fourth position through the third and second positions and to the first position,
and wherein with the tubular member in the first position, the control circuitry is operative to cause the air supply assembly to cause positive pressure to be applied in the upper end of the tubular member, whereby the carrier is caused to move downward through the interface site.

20. The apparatus according to claim 19 wherein the control circuitry includes stall detection circuitry operative to detect a stall condition associated with at least one of the mechanism and the air supply assembly.

21. The apparatus according to claim 19 and further comprising a cradle in supporting connection with the terminal, wherein the cradle is positioned adjacent the delivery opening and is configured to support a carrier extending in the delivery opening, and wherein the cradle is movably mounted in supporting connection with the terminal through at least one member including at least one frangible portion.

* * * * *